United States Patent [19]

Pufahl

[11] Patent Number: 4,699,824
[45] Date of Patent: Oct. 13, 1987

[54] ADHESIVE TAPE

[76] Inventor: Joseph Pufahl, 625 Main St., Westbury, N.Y. 11590

[21] Appl. No.: 185,026

[22] Filed: Sep. 8, 1980

Related U.S. Application Data

[60] Continuation-in-part of Ser. No. 77,073, Sep. 19, 1979, abandoned, and a continuation-in-part of Ser. No. 115,262, Jan. 25, 1980, abandoned, which is a continuation of Ser. No. 817,057, Jul. 19, 1977, abandoned, which is a continuation-in-part of Ser. No. 400,315, Sep. 24, 1973, abandoned, said Ser. No. 77,073, is a division of Ser. No. 817,057.

[51] Int. Cl.$^4$ .............................................. B05D 5/10
[52] U.S. Cl. .................... 428/220; 428/317.7; 428/337; 428/423.1; 428/425.1; 428/537.5; 428/689; 428/702; 428/704
[58] Field of Search ............. 428/220, 249, 261, 264, 428/278, 337, 425.1, 317.7, 423.1, 537.5, 689, 702, 704

[56] References Cited

U.S. PATENT DOCUMENTS

| | | | |
|---|---|---|---|
| 2,001,049 | 5/1935 | Alden | 91/68 |
| 2,173,829 | 9/1939 | Drew | 91/68 |
| 2,848,105 | 8/1958 | Bartell et al. | 206/59 |
| 2,884,342 | 4/1959 | Wolff | 117/122 |
| 2,905,584 | 9/1959 | Dunlap | 162/135 |
| 3,055,496 | 9/1962 | Dunlap | 206/59 |
| 3,068,121 | 12/1962 | Weschler | 117/122 |
| 3,404,021 | 10/1968 | Newman et al. | 117/36.1 |
| 4,048,125 | 9/1977 | Ingram, II | 260/7 |

FOREIGN PATENT DOCUMENTS

| | | |
|---|---|---|
| 596973 | 1/1948 | United Kingdom . |
| 960267 | 6/1964 | United Kingdom . |
| 975947 | 11/1964 | United Kingdom . |
| 1046440 | 10/1966 | United Kingdom . |
| 1157901 | 7/1969 | United Kingdom . |
| 1203239 | 8/1970 | United Kingdom . |

*Primary Examiner*—Bernard D. Pianalto
*Attorney, Agent, or Firm*—Fitzpatrick, Cella, Harper & Scinto

[57] ABSTRACT

A pressure-sensitive adhesive tape of particular utility as a flying splice, as a retention means in manufacturing processes and a mounting tape in applications requiring a flame retardant adhesive capable of functioning effectively at elevated and severely reduced temperatures and pressures and composed of a frangible substrate formed of a ply of a cured thermoset resinous aldehyde-based condensate or a fibrous cellulosic web impregnated with said condensate, said condensate being deposited in said web prior to curing thereof; and an elastomeric pressure-sensitive adhesive adherent to at least one side of said substrate; said adhesive being characterized by a solubility prior to curing in a solvent medium in which said condensate is insoluble when cured.

89 Claims, 2 Drawing Figures

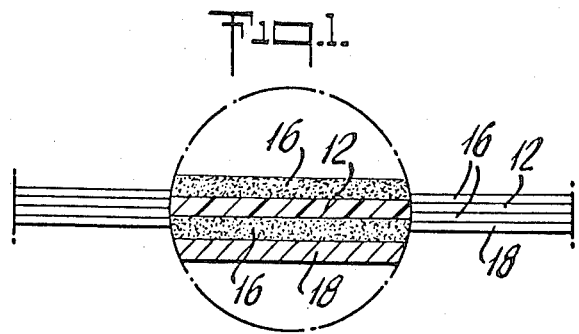
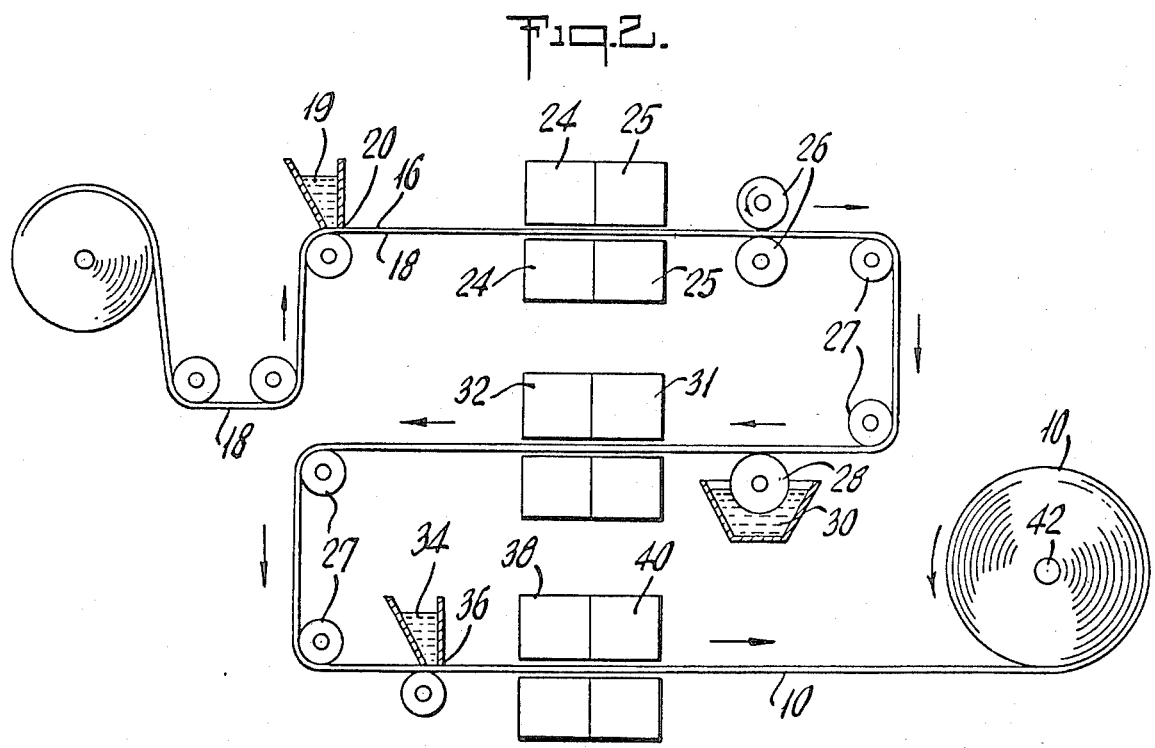

ADHESIVE TAPE

This application is a continuation-in-part of copending application Ser. No. 77,073 filed Sept. 19, 1979, and earlier filed and presently copending application Ser. No. 115,262 filed Jan. 25, 1980; the former application a divisional and the latter application a continuation of application Ser. No. 817,057 filed July 19, 1977, which is, in turn a continuation-in-part of application Ser. No. 400,315 filed Sept. 24, 1973 by the applicant herein, all now abandoned.

This invention relates to an improved, normally tacky, pressure-sensitive adhesive tape, incorporating a thermoset aldehyde resin substrate including, in addition, in one embodiment, a unified fibrous cellulosic web backing, of minimal thickness and good flexibility, and having a high edge tear particularly in the cross-machine direction, for application particularly within the paper manufacturing and air and space craft industries. The tape so provided should have, in addition, sufficient cohesiveness to prevent delamination of the backing upon unwinding of the tape for one of its intended uses as splicing means in the manufacture of paper and paper products and the printing thereof.

This invention relates, additionally, to a tape and preferably a two-sided tape, that is, one with adhesive on both sides of the carrier substrate as characterized generally hereinabove, and particularly where a cellulosic web is incorporated in the substrate, suitable for assembling a plurality of superimposed metal sheets in stable relationship to each other while being advanced and stamped in a die punching operation without an undesired crowning of the articles, such as gaskets, produced by the stamping process. Crowning, as the bending or deformation about the periphery of a stamped article has been termed by those skilled in the relevant art, has resulted normally heretofore from use of adhesive tapes from which the elastomeric adhesive has been expressed or squeezed upon meshing of the male and female dies in the punching operation; a shortcoming precluded by the reduced thickness, a tensile strength, rigidity, frangibility and related properties of the tapes of the invention; which also permits a clean severance of the tape in the stamping operation without adherence of elastomer or fiber to the dies.

The tapes of the invention, in another and particular embodiment manifest a flame retardancy and sheer strength at both elevated and reduced temperatures and pressures that meet exacting governmental standards over extended periods of time, with material inhibition of the migration, vaporization and sublimation generally characteristic of tapes including conventional flame retardants known heretofore. The tapes of the invention thus have unique utility as mounting tapes in aircraft operating at reduced pressures, at high altitudes or in tropical and arctic conditions, a property not available in adhesive tapes used generally heretofore and an unfulfilled need known to exist in the relevant art for an extended period of time.

The tapes of the invention have utility, as well, for mounting flexographic printing plates, as a transfer tape for use with cut mounting systems in newspaper composing rooms, as an adhesive transfer tape for application to plastic bags made, illustratively, of polyethylene that can be repeatedly opened and made to re-adhere, as for example, where the contained merchandise must be available for frequent unwrapping and inspection.

Other industrial and domestic uses of the subject matter of the invention will also be evident to those skilled in the art.

Means have been known heretofore for the splicing of breaks or for connecting the ends of the two separate rolls in the manufacture, post-treatment and handling of paper where, for example, paper web freshly formed, is clay coated or otherwise sized, and rewound; where it is slit in the machine direction and again rewound; where it is simply being rewound from one large roll after manufacture to smaller rolls for more ready handling and transport; and where paper is rewound in the printing operation. Kraft gum, used as a splicing tape on occasion heretofore, does not provide the user of the splicing material with a tape having a tensile strength of assured adequacy or cohesiveness in the machine direction.

In addition, where impregnants have been used to increase the tensile strength and delamination resistance of the backing, the edge tear, elongation and flexibility of the sheet have often been adversely affected to a significant extent.

The splicing tapes used commercially heretofore have often involved another substantial disadvantage in that the splice has been made to adhere to the ends of the paper to be connected and rewound by application of heat, usually by means of a heating iron; an uneconomic use of time and effort.

It has also been known to use animal glue and similar compositions without a tape for splicing in paper manufacturing, processing, printing and the like, and while these compositions have been used even where "flying splices", splices formed without halting the winding operation, have been involved, their utility is limited in that they can be employed only where the winding of one roll is being completed and another roll or web is to be connected, for the glue must be applied in the liquid or semi-liquid state and time permitted thereafter for it to become tacky. On the other hand, if too much time is permitted before the splice is made, the glue will dry to a brittle, nontacky mass unsuitable for creating the necessary bond.

A tacky pressure-sensitive backing adhesive sheet for pressure-sensitive adhesive tape employed in bookbinding stock, shoe midsoles, shoe cover stock and the like is described in U.S. Pat. No. 2,905,584. The patent suggests the incorporation by a beater-impregnation process of an elastomeric polymer such as polychloroprene or natural or butyl rubber into an aqueous pulp slurry of cellulosic fibers by use of a water-soluble polymer having at least three functional groups, e.g. a guanidinealdehyde reaction product that is then formed into a sheet of the treated fibers from which residual water is removed. The sheet is then treated with a solution of a resinous polymer, e.g., one obtained by reaction of an aldehyde, e.g. formaldehyde, with urea, melamine or phenol incompatible with the elastomeric polymer previously incorporated therein to provide a backing sheet of high wet tensile strength and delamination resistance for a pressure-sensitive adhesive tape with a concomitantly increased resistance to tear resistance, for example, in the cross-machine direction; properties undesirable in formulating a flying splice. The patentee notes, additionally, that undesirable qualities such as stiffness may be apparent where excessive resinous polymer is present and recites a normal ratio of cellulose fibers to elastomeric polymer to resinous polymer of 100:20:1.

An adhesive transfer tape specifically recommended for use as a flying splice heretofore and marketed commercially is that comprising a film of acrylate adhesive deposited about a randomly distributed web of glass fibers and supported on a silicone coated kraft glassine release tape. This product, while satisfactory for some purposes, is costly and manifests a relatively high tensile strength and tear value and significant cross-sectional thickness. A high tear value precludes or reduces the ease of termination of the splice from the remainder of the roll or other assembly of which it is part.

Accordingly, the provision of a pressure-sensitive adhesive tape that has a minimal thickness and edge-tear so that it can be readily terminated or torn in the cross-machine direction while possessed of a tensile strength sufficient to maintain the continuity of the tape under stress in the machine direction and one capable of incorporating a unique and protracted flame retardance under a variety of environmental conditions would provide a significantly improved "flying splice" for use in the paper industry, a materially enhanced tape for use in certain metal stamping operations, one of significant usefulness in the air and spacecraft industries, and a material and unexpected advance in the state of these relevant arts.

In accordance with the present invention, therefore, a pressure-sensitive adhesive tape is provided wherein the substrate or backing is a sheet of an initially water-soluble or water-dispersible thermosetting resinous composition cast as a molecularly homogeneous continuous sheet or impregnated in a continuous, fibrous porous cellulosic web; one or both sides of said sheet or impregnated web being coated with a water insoluble elastomer-containing pressure-sensitive and normally tacky adhesive composition.

The tape thus provided in accordance with the present invention has a balance of properties and characteristics such that, as regards tensile properties, for example, an effective tensile strength exists in the machine direction, and an efficacious cross-grain tear strength is maintained, that is, an internal tear strength sufficient to resist and prevent the splice formed of the tape from being torn, illustratively, by the pull and drag of the rewind roll and feed roll in a printing or paper-making assembly. The tape will at the same time possess a cross-machine edge tear resistance which is sufficiently low to enable a section of tape to be separated from the remainder of the roll on which it is usually retained prior to use. Further, the tape provided according to this invention will be sufficiently resistant to forces to which it will be subject from an angle perpendicular to the surface of the tape to resist delamination of its adhesive layers from the thermoset resin, or thermoset resin-impregnated, substrate. This unique combination of qualities will endure even at the elevated temperatures utilized in the printing, paper-making, air and spacecraft manufacturing and allied arts. Further, the laminate provided by the invention is of such minimal thickness that the splice it produces will not materially alter the thickness of any paper product to which it is affixed. This latter property is a necessary criterion since any substantial variation in thickness imposed by a splice will tend to cause damage, by way of illustration, to the compression cylinders, blanket to plate nip rolls or the like, of the conventional printing press, as well as undesired crowning in stamping operations, as described elsewhere herein.

In a particularly preferred embodiment, illustratively, where used as a flying splice from which the cellulosic web is excluded, the substrate or backing sheet has a reduced cross-sectional dimension; materially reduced edge tear and tear value properties in the cross-machine direction providing a cleaner, easier, break when torn for use.

The tapes so provided have, additionally, the ability to eliminate crowning in a stamping operation, particularly where an impregnated cellulosic web is utilized and to meet exacting standards and requirements of flame retardance, shear strength and shelf life when employed as a mounting tape in another of the invention's embodiments.

The present invention, however, both as to its organization and mode of preparation, together with further features and advantages, will be better understood from the following detailed description together with the accompanying drawing in which:

FIG. 1 is a sectional view of the laminated adhesive sheet prepared according to the present invention.

FIG. 2 is a diagrammatic side elevation of apparatus for producing the multi-ply or laminated sheet or tape of FIG. 1.

Referring now in detail to the accompanying drawing, there is shown in FIG. 1 the laminate tape 10, comprising a continuous, unified sheet or ply 12 composed, for example, of an initially water-soluble or water-dispersible aldehyde based thermosetting resin composition, such as formaldehyde. The foregoing sheet includes, in a further embodiment, preferred for several of the applications described herein, a self-sustaining, continuous, unified cellulosic or paper web substrate 12 of low basis weight and thickness, impregnated with the foregoing initially water-soluble or water-dispersible aldehyde composition. The sheet or impregnated web or tape 12 is coated with a water insoluble elastomeric, pressure sensitive-adhesive 16. The adhesive is, in the preferred embodiment of the drawing, disposed on both surfaces of the substrate 12, and a release tape 18 is, in turn, attached to the outer surface of the adhesive 16. The assembled tape 10, whether composed of the molecularly homogeneous thermoset film or impregnated cellulosic sheet 12, when coated with elastomeric adhesive 16, can then be rolled up on itself in a manner well-known and utilized by those skilled in the art to which this invention pertains for better preservation of the tack properties of the adhesive in the distribution and marketing phases preceding actual use for the purpose for which it is designed. The product of this invention may be preserved in this rolled form ready for immediate use for extended periods of time without deterioration or aging. It will be obvious as well to those acquainted with the field that the application of release tape 18 to the outer surface of the adhesive 16 or, indeed, the application of resin adhesive to more than one surface of the substrate 12 with or without the release tape 18 superimposed thereon in each instance is not critical to a definition of this invention; although application of adhesive to both sides of the substrate is materially preferred and often critical in securing the objectives herein described.

The adhesive 16, as will be evident from the description appearing hereinafter, need be water-insoluble only on one surface of the substrate 12, since it will be deposited thereon only after condensation of the thermosetting resin to the water-insoluble, continuous state. Thus, where present on one or both surfaces of the substrate or sheet 12, and whether the latter includes a cellulosic web or not, the substrate 12 and elastomeric adhesive 16 on only one surface thereof need exist as, prior to curing, or be deposited from, solvent systems incompatible with the resins of the contiguous ply.

It is significantly preferred, however, that the adhesive be water-insoluble, when applied to both sides of the substrate 12, although they may conveniently, be water-dispersible and often are, as for example, where acrylic resins, such as described hereinafter, are used.

The substrate composed of a thermosetting aldehyde based resin composition used either alone as a molecularly homogeneous sheet, or as an impregnating composition incorporated in a cellulosic web; and the elastomeric pressure-sensitive adhesive employed in the practice of the invention are individually well known to those skilled in the art as is their method of preparation, and will not require extensive discussion therefore.

Consistent, however, with the intended use of the laminate 10 of the invention in the paper manufacturing and printing arts, metal stamping processes and use in conditions of widely varying temperature and pressure, the thickness of the thermoset resin sheet or impregnated cellulosic substrate 12 must be reduced as much as possible without being disabled from performance of the various functions and objectives which dictate their use herein. The thickness of the substrate can thus be varied from about 0.7 mil (0.0007 inch) to 4 mils (0.004 inch) and indeed up to 13 mils (0.013 inch), and more. The upper limit is, however, while operative, less preferred where employed as a flying splice. Where an impregnated cellulosic web is utilized for this purpose a minimal thickness of about 1.2 mil (0.0012 inch) is particularly desirable for most applications and a thickness of from a minimum of about 1 mil (0.001 inch) to about 1.7 mil and indeed up to 4 mils represents a preferred range.

The most effective and significantly superior sheets or substrates for use in splicing, and, particularly, flying splices, on the other hand, are those from which paper or other fibrous materials are excluded, and which have, and can have, as a consequence, a thickness of as little as 0.7 mil and, expressed as a significantly desirable range, 0.7 mil to 1 mil and preferably 0.8 mil.

Encompassing, generally, all of the particular and unique applications to which the tapes of the invention may be put, the preferred thickness of the substrate is normally up to about 11 mils. A preferred scope, where the substrate is to be employed as a retaining member between superimposed metal sheets, such as aluminum, in a stamping or die-punch operation (where, for example, a plurality of gaskets or other articles are punched out simultaneously by meshing of male and female die components) is from about 4 to 10.4 mils and most desirably about 4 to 5 mils. The rigidity of the substrate, which is preferably an impregnated cellulose web, prevents crowning about the periphery of the formed and stamped articles whereby the outer margins of the punched articles are bent or otherwise deformed; an undesired property normally experienced using the adhesive tapes known heretofore and resulting in the rejection of many of the articles produced. The use of the cellulose impregnated laminate of the invention in the foregoing thicknesses bearing adhesive on both sides of a cellulose-impregnated substrate substantially eliminates the foregoing undesired deformation, too, it is believed, because the substrate permits reduction in the amount of elastomeric adhesive used in contrast with tapes employed heretofore in which the elastomer content has often been such as to result in exudation of the adhesive out and about the periphery of the stamped articles under the impact of the dies in the stamping process.

The foregoing thicknesses of the substrates for use in manufacturing processes are those preferred for a further unique and unexpected practice to which the tapes of the invention are applied wherein the substrate is, again, preferably, an impregnated cellulosic web, and which, with the adhesive coatings or plies present on the opposed surfaces thereof, can include a variety of flame retardants with minimum loss due to migration, sublimation, vaporization even at reduced, $-40°$ F., or elevated, e.g. 158° F., temperatures and in a partial vacuum; with minimal modification of the physical properties of the tape otherwise. These tapes are thus characterized by persistent and substantialy unabated flame retardancy over protracted periods of time and a significant and undiminished shear strength and heat resistance.

This is accomplished by excluding flame retardant from the elastomeric adhesive and the incorporation thereof in the substrate.

It is known to introduce flame retardant, brominated organic and phosphorus containing compounds, alone or in combination, into elastomeric adhesives to render them flame retardant. The use of flame retardant inorganic salts would also be feasible to attempt. Significant disadvantages lay, however, in these available avenues; disadvantages precluded by the inclusion of the flame retardants in the thermoset resin of the substrate, and preferably in the impregnated cellulosic substrate of the invention.

The foregoing general classes of conventional flame retardants serve well to illustrate the unexpected advantages of the present invention.

Thus, brominated hydrocarbons, where employed as flame retardants in an elastomeric adhesive, serve also as plasticizers for the elastomer, and will markedly reduce its shear strength. At the same time, there is a material tendency of the flame retardant to migrate to the surface of the elastomer particularly under extreme conditions of temperature and pressure such as contemplated by the invention.

The phosphorus-containing flame retardants, in turn, while not acting normally as plasticizers will volatilize over an abbreviated period of time.

The incorporation of inorganic flame retardant salts in the elastomeric adhesive is not normally a desirable alternative in that the salt or salts would be incorporated in the elastomeric adhesives prior to their being cured. A preferred method for applying these adhesives, however, is in the form of a latex which would in the presence of the foregoing salts tend to curdle and redisperse the latex components. Even if the adhesive were applied to the substrate or backing sheet by other conventional means the salts would exhibit a strong tendency toward migration, thus minimizing their effectiveness over a relatively brief period of time. Migration is substantially or completely eliminated particularly where these salt are present in the substrate of the invention, particularly where a cellulose web is employed by virtue of the polar nature of these compounds and their attraction to cellulose. Volatilization and sublimation are reduced or eliminated by the presence of the cured layers of adhesive enclosing the substrate.

As a consequence, the tapes of the invention, thus embodied, can be used, illustratively, in arctic and subarctic as well as temperate and tropical climes and will meet aviation flammability tests as well as qualify for use in the cabin construction of aircraft, securing, for example, the interior panelling and decorative surfaces to the interior of the exterior cabin wall, the latter made frequently from materials such as a resinous phenol-formaldehyde, e.g. BAKELITE, reinforced with glass fibers.

The standards applicable to this latter application are particularly rigorous due to the variations in temperature, for example, from −40° F. to 158° F., and pressure to which aircraft are exposed when sitting in a hangar or on a runway in a tropical or arctic environment and the increasing altitudes at which aircraft are flown.

The elastomeric adhesive coating 16 imposed upon the non-cellulosic substrate 12 is, in any event, one having a thickness of from 0.3 mils and more desirably, 1.3 mil to 4 mils deposited as one, or preferably two plies. The preferred thickness for use in splicing tapes is up to about 2.3 mils, however, and in a significantly superior laminated flying splice tape is about 1.5 mils. The thickness of the elastomeric coating 16 is significant in imparting some flexibility to the substrate 12 of the laminate 10 without breaking, as well as for its adhesive qualities.

Where, again, the tape is to be employed in stamping operations or as a means for mounting or bonding particularly in application to aircraft each adhesive layer present has a thickness desirably of up to and including 4 mils, with a thickness of about 1.3 mils to 2.3 mils preferred.

An operative thickness for the laminate 10 is within the range of about 2 mil to about 21 mils.

A desirable illustrative thickness of the laminate 10 is within the range of 2 mils to 3 mils and preferably 3.3 mils to 5.6 mils and indeed up to 12 mils where an unsupported homogeneous resinous sheet is used, and, where an impregnated cellulose substrate is employed, desirably from about 2.3 mils and more desirably, 3.8 mils to 4 mils and indeed up to 6.3 mils with a thoroughly operative scope extending up to 12 mils; the foregoing encompassing the most desirable embodiments when the tape is to be used for splicing, and particularly as a flying splice.

Where the adhesive tape of the invention is to be employed in a stamping or punch-die manufacturing process or as a means for mounting or bonding in application to aircraft and the like to accommodate a broad spectrum of temperature and pressure a desirable thickness is from 3.8 mils to 13 mils and most desirably 3.8 mils to 12 mils.

The terms "thickness" and "effective thickness", as employed herein, with reference to the laminate or tape 10 are intended to embrace the adhesive tape composed of substrate 12 and pressure sensitive adhesive 16, less the release tape or liner 18; and thus, the state in which the adhesive tape of the invention is actually employed, for example, as a flying splice.

Whether a cellulosic web is present or not, employing the method and apparatus hereinafter described, the tensile strength may be substantially isotropic, that is, substantially equivalent, or anisotropic, that is, different, in the machine and cross-machine direction. A tensile strength in both machine and cross-machine direction of as little as 0.125 pounds per square inch of width at break (lb./sq.in.) is desirably imparted to the tape 10 of the invention, using a sheet of unsupported thermosetting resin as the substrate, to as high as 0.8 lb./sq. in. where an impregnated cellulosic web is substituted for the unsupported resinous sheet. This range thus provides the significantly preferred balance of properties essential to an optimally effective flying splice according to the invention. A tape attaining a tensile strength within the foregoing range of 0.125 lb./sq. in. of width to 0.8 lb./sq. in. of width will have a thickness in cross-section of 1 to 2.7 mils of which 0.7 mil to 1.5 mil is afforded by the substrate 12 and the remainder by elastomeric adhesive 16. The thicker tape will have the higher tensile strength. The range in tensile strength may be extended to as high as 1.0 pound per inch within the purview of the invention, but is materially less preferred.

In an alternative embodiment coming within the present invention a machine tensile strength, that is the tensile strength along the length of the sheet where a cellulosic substrate is employed in the laminate is desirably about 3.5 to 4.5 and preferably within this range, about 4 ounces per inch as opposed to the cross-machine direction tensile strength, that is the tensile strength across the width of the substrate, of 0.05 to 2.0, and preferably about 1 ounce per inch. The foregoing tensile strength values are secured particularly with the embodiment of the invention wherein an impregnated cellulosic web is employed as the substrate so that there is an anisotropic distribution of tensile properties in the machine and cross-machine directions.

The tensile strengths are determined herein using a Scott tester (Model CHE) having a 12 inch jaw extension.

As indicated hereinabove, shear strength is of particular significance in the practice of the invention where the tape provided is to be used at wide variations of temperature and pressure. Shear strength is determined by applying one square inch of the tape, bearing adhesive on its two sides, to the side of a vertically disposed stainless steel panel. To the opposite surface of the tape is made to adhere a strip of aluminum, to the lower end of which is attached a 1 kilogram weight. The weight must remain, its position unchanged, adhering to the tape and the tape, in turn, to the vertical panel for a period of 1 week to meet governmental requirements and must do so with the test procedure repeated at −40° Fahrenheit (F.), 72° F. and 158° F.; thus providing for the arctic and tropical as well as the more temperature conditions referred to elsewhere herein.

The acrylic resin adhesives described hereinafter are particularly preferred for this purpose and would ordinarily afford the necessary resistance to shearing were it not necessary, as has been the practice heretofore, to incorporate flame retardants in the adhesive to meet aviation flammability test standards.

The practice of the invention permits use of tapes of minimal thickness, in part, because, of the omission of flame retardants from the adhesive, and because of the substrate which, while assuring continuity and integrity to the extent required, provides a ready haven, particularly where a cellulosic substrate is employed, for the flame retardants, at no sacrifice to the physical properties of the unique laminate. As noted earlier, inorganic salts, polar in nature, are especially adherent to the interstices of the cellulosic web, and thus resistant to migration into and through the adhesive coating under even the most vigorous and unfavorable conditions to which the tape may be subjected.

As indicated heretofore, the homogeneous unsupported thermosetting resinous sheet forming the substrate 12 and also the impregnant composition for the paper web of one embodiment of the substrate; providing to the resulting tape, together with the pressure-sensitive adhesive, balanced properties of edge tear, tensile and internal tear strength, and elongation, flexibility, shear strength, and delamination and heat resistance, are thermosetting aldehyde-based resins or condensates that are, prior to curing, water-dispersible or water-soluble. The terms, "water-dispersible" and "water-soluble" are meant to include those resins or condensates that are initially dissolved or dispersed respectively in such water-miscible organic solvents, as, for example, ketones, cellosolves, alcohols and the like, and by way of more particular illustration, acetone, methanol, ethanol, butanol, methyl cellosolve, butyl cellosolve and ethyl cellosolve; and those condensates, most particularly that remain in solution when amounts of water by weight of about 20 percent to 70 percent are added thereto.

Where the resin is to be applied to a cellulosic substrate it is desirable to incorporate a small amount of a conventional wetting agent in the thermosetting resin solution or dispersion, for example, an ethylene oxide condensation product of sorbitan monolaurate, cetyl alcohol, dodecyl alcohol or isooctyl phenol.

The thermosetting resin-forming compounds employed are amino aldehyde and phenol aldehyde water-soluble and water dispersible condensates. The aldehydes useful in preparing the condensates of the invention are, illustratively, those having from 1 to 6 carbon atoms such as glutardialdehyde formaldehyde, acetaldehyde, glyoxal and furfural. Formaldehyde is a particularly preferred reactant. Where enhanced flame retardancy is desired particularly, trichloro-acetaldehyde chloral, may be substituted in whole or in part for an equivalent amount, on a stoichiometric basis, of formaldehyde or such other aldehyde as may be employed in forming the condensate of the substrate.

The preferred condensates for use herein are preferably those wherein the aldehyde is reacted with amine precursors. Of these condensates the most effective and significantly preferred are those incorporating a moiety of the general formula $(N=C-N-CH_2OR)_n$ where n has a value of about 1 to 3 and R is hydrogen or an alkyl radical of from 1 to 4 carbon atoms. Further illustrative of the foregoing are those condensates formed by reaction of formaldehyde with diamino-substituted or triamino substituted azines, most desirably triazines, such as a-or-v-triazines and those particularly having a symmetrical configuration (i.e. s-triazines) and three or more, that is three to six, aldehyde reactive hydrogen atoms. While the triazine-aldehyde, and particularly the s-triazine aldehyde, condensates are significantly preferred to accomplish the purposes of the invention alone or in combination with other co-condensates, also desirably employed are the carbamide, for example, urea aldehyde resins and phenol aldehyde resins. The latter are generally less preferred because of the particular combination of properties imparted to the substrate, including marked coloration and odor.

Physical blends of the foregoing thermosetting resin condensates may be, and are, utilized according to the invention, also. Indeed, mixtures of the resin precursors such, by way of illustration, as diguanamine, urea, melamine, phenol and resorcinol or other amine and phenol precursors, as further characterized hereinbelow, may be co-reacted with the selected aldehyde to form a co-condensate.

Suitable resin amine, phenolic and aldehyde precursors are well-known to the art. The most desirable resin precursors for reaction with the aldehydes are, as indicated, the amino, and within the context of the present invention, amide reactant compounds including cyclic or acrylic amide or amide-imide tautomer derivatives, and particularly, the foregoing substituted s-triazines including melamine, substitued derivatives thereof such as lauroguanamine, methyl-substituted melamines, dimethylol melamine, hexamethylol melamine, and their wholly or partially etherified derivatives such as dimethylol tetra methoxy methyl melamine, dimethyloltetrabutoxy methyl melamine, and hexamethoxymethyl melamine, guanamine, diguanamines such as propioguanamine, acetylamino-N-bis (butyroguanamine), naphthylamino-N, N-bis (propioguanamine), acetoguanamine, 2,4,6-triaminopyrimidine, 2,6-diaminopyrimidine, guanyl urea, and other diaminotriazines. An unsubstituted s-, a- or v-triazine which has no aldehyde reactive hydrogen atoms is not employed in formulation of the thermosetting condensates for use herein.

Other azines, and more particularly other pyrimidines, for use as the amino component of the thermosetting resins of the invention and containing 3 to 6 aldehyde reactant hydrogen atoms are, illustratively 5-methyl-2,6-diamino-1,3-diazine and 4-chloro-2,6-diamino-1,3-diazine. Hexamethoxymethyl melamine is preferred because of its relative stability at room temperature and its ready capacity to cure and cross-link rapidly at even mildly elevated temperatures. Where chloral is employed as the aldehyde reactant the amino reactant is preferably an azine.

Less preferred ordinarily, but operative amino (or amidogen) precursors are the cyclic or acyclic amides or amide-imide tautomers and thermosetting resin forming precursors such as carbamides and particularly the ureas, for example, urea, methyl urea, phenyl urea and dicyandiamide, dimethylol urea and dimethylol methyl urea, glycourils, melem and the like. A particularly preferred reactant where flame retardancy is an objective is thiourea.

The term "phenol", is employed herein, is intended to embrace aldehyde and aldehyde-reactable phenols and substituted derivatives of phenol such as phenol, cresylic acid, resorcinol, xylenol, and other monohydric and dihydric phenols.

The method of forming condensation products of aldehyde and aldehyde-reactable amino (or amidogen) compounds is well known in the art. It is desirable in preparing the preferred aldehyde (and particularly formaldehyde)-amino, for example, azine and, more specifically, the s-triazine, condensation products for use in the practice described herein, to employ generally about 1 mol to 6 mols, with an extension of the operable range, minimally to about 0.05 mol, of aldehyde reactant to 1 to 2 mols of amino, e.g., triazine, precursor.

The ratio of aldehyde is based desirably on the number of reactive amino groups or the number of reactive hydrogens present in the amine reactant, whether it is as azine or carbamide. The secure the requisite thermoset resin one of the reactant components, the aldehyde, is difunctional. Thus, the maximum is 2 mols of aldehyde per amino group, or one mol of aldehyde for each reactive hydrogen. Thus, 6 mols of aldehyde per mol of melamine represents a theoretical maximum because melamine has three reactive amino groups, and consequently 6 reactive hydrogen atoms. With a carbamide such as urea, a ratio of 2 mols to 3 mols of formaldehyde per mol of urea is desirably employed. It will be evident that a lower ratio of aldehyde is usually employed with carbamides than with triazines. It is preferable to use somewhat less than the theoretical maximum equivalent of aldehyde in order to obtain resins which convert or cure more rapidly to the infusible stage.

The amine (or amidogen)-aldehyde condensates may be employed in unmodified form or in the form of their corresponding alkyl ethers, wherein the alkyl group contains 1 to 4 carbons desirably, by reaction of the amine (or amidogen) aldehyde reaction product in known manner with aliphatic alcohols, as indicated elsewhere herein, e.g. $C_1$ to $C_4$ alcohols, especially methanol and butanol.

The condensates constitute monomers or even low polymer liquids or colloids of, for example, five to six monomer length, and are, at this stage, water-soluble or water-dispersible. Since they are of low molecular size they are particularly adapted to penetration, where present, of the cellulosic fibers of the substrate.

As indicated, the most effective and significantly preferred condensates are azine condensates including, illustratively and most desirably, the methyl ether of trimethylol melamine, for example, tris methoxy methyl melamine, hexamethoxy methyl melamine and tris hydroxymethyl tris methoxy methyl melamine and mixtures thereof. Mixtures of urea-aldehyde condensates and triazine aldehyde condensates, indeed, form desirable substrates, or impregnants informing substrates, for use herein where economy is desired. Illustrative of these latter mixtures of condensates is the mixture of modified methoxy methyl melamine and methoxy methyl urea sold by American Cyanamid Corporation under the trade name AEROTEX 23 Special. The proportions of melamine and urea components may, for the purpose of this invention, vary within the range by weight of 5 percent to 95 percent of melamine and 95 percent to 5 percent urea components. Methylated trimethylol melamine from the same source under the trade name AEROTEX M-3 is also a particularly desirable condensate for use herein.

The molar ratio of aldehyde to phenol where a phenolic thermosetting resin is employed varies within a conventional range of 1 to 3 mols of aldehyde per mol of phenol, and is, as indicated, used in its initial A-stage.

The amino aldehyde or phenol-aldehyde (including, for example, resorcinol formaldehyde) condensates for use herein are available commercially in aqueous solutions or dispersions containing by weight from 40 percent to 80 percent solids, and preferably about 50 percent.

The aldehyde condensate will provide desirably from 10 percent to 25 percent of the solids content; the remainder constituting non-reactant organic plasticizers such, for example, as toluene sulfonamide, dioctyl phthalate and the like. Before application as the substrate alone or impregnation into the paper web forming the substrate, the foregoing condensates may be further diluted with water to proper concentration and mixed. The concentration and pick-up are controlled particularly so as to incorporate in the paper web, where employed, from one percent to ten percent of the water-soluble condensates based on the dry weight of the paper.

In order to secure uniform distribution, and where impregnated in a cellulosic web, wetting and distribution of resin condensate in the foregoing web, it is desirable to add a small amount of wetting agent, preferably, although not necessarily, a non-ionic wetting agent, to the resin solution, such, for example, as Triton-NE, a 30% water solution of an ethylene oxide condensation product with iso-octyl phenol, and Tween 20, an ethylene oxide condensation product with sorbitan monolaurate. In order to polymerize and cure the aldehyde-based condensate, a suitable amount of conventional catalyst is added to the condensate immediately prior to heating thereof to a brittle sheet or treatment of the paper web into which the condensate has been introduced with conversion thereof in a similar manner.

Flame retardants, whether reactant or non-reactant additives, or those catalysts or accelerators used as flame retardants, are also introduced at this time.

Conditions, such as pH, and the percentages of solids present will vary, depending on, for example, the particular aldehyde, azine, phenol or mixture and ratio thereof, and the particular catalyst employed.

The ooperable pH range over-all is from about 3 to 10. The phenolic aldehyde condensates are reacted at a pH of about 8 to 10, and most desirably about 9.5, using conventional alkali metal salts. The azine aldehyde condensates are reacted in a pH range of 3 to 10 preferably 3 to 5. The carbamide aldehyde condensates are polymerized in a range of 3 to 8 normally, and preferably from about 3 to 4.

The catalysts or accelerators employed in polymerization of the amine aldehydes are normally the conventional acid catalysts, such, for example, as diammonium phosphate, hydrochloric acid, sulfuric acid, acetic acid, benzene sulfonic acid, p-toluene sulfonic acid, and most desirably, ammonium chloride or zinc sulfates, ammonium sulfamate, ammonium sulfate, aluminum sulfate and ammonium oxalate. The amount of water present, while sufficient to assure even distribution and thickness, e.g. up to 15 mils, of the dispersed or soluble condensate must, of course, also be adequate to accommodate the condensate in solution or as a dispersion and to dissolve the catalyst involved, where, for example, a salt such as ammonium chloride is used.

The azine aldehydes tend to polymerize more rapidly than the carbamide aldehydes and have a greater resistance to oxidation and hydrolysis. Hence, a lower pH and a higher condensation temperature are employed generally with the latter. Temperatures of at least 60° C. are generally employed and not in excess of the boiling temperature of the reaction mixture. Atmospheric pressure is used most conveniently and a temperature of between 60° C. and about 105° C.

The reaction is carried out to the extent that curing and cross-linking of the polymerized monomers and condensate are substantially complete and the product, consequently, has maximum brittleness or frangibility.

The function of catalyst may optionally be at least partially filled by use, in the solution or dispersion of the thermoset former, of any inorganic flame retardant like di-ammonium phosphate or ammonium polyphosphate. Organic flame retardants may be included alternatively, or in addition, to the foregoing inorganic salts as described elsewhere herein and may serve other additive purposes as well. The aryl diglycidyl ethers, for example, and specifically those of the formula, $R(OCH_2CHCH_2O)_n$ wherein R is fluoryl, phenyl, bis phenol A or halogenated bis phenol A, are effective combustion inhibitors and cross-linking agents infusing even greater frangibility into the substrate in which they are introduced. Illustrative of these compounds are the glycidyl di-ether of tetrabromo-bis phenol A or the newer halogen-free 9,9-fluorylidene-bis-(4-phenyl glycidyl ether).

A particularly preferred class of combination cross-linking flame retardants are the "blocked" polyisocyanates derived from the aromatic polyisocyanates, and their cyclic trimers, the so-called "isocyanurates". The "blocked" aromatic polyisocyanates or so-called "splitters" employed are those that become unblocked or reactive in a temperature range that accommodates to the drying and curing temperatures of the thermoset resin, that is about 200° F. to 350° F. The blocking agents employed, for this purpose, are, most desirably, phenol or the ketoximes, well-known in providing the foregoing hindered adducts.

The preferred aromatic polyisocyanates, and those from which the significantly preferred aromatic polyisocyanurates for use herein are derived, are tolylene diisocyanate and polymethylene polyphenyl polyisocyanates of the general formula:

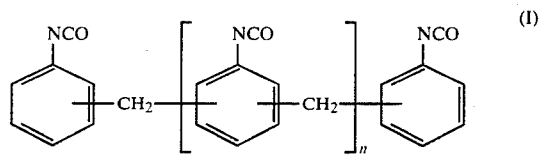

(I)

wherein n is predominantly an integer generally of 1 or 0 or a mixture wherein n is primarily 1 in a preferred embodiment and to a lesser extent 0, and thus the trimer, dimer of mixtures thereof, and where this isocyanate is used in an undistilled state, may include residual or trace quantities of high polymers as well. The preferred composition is one containing an excess of 50 percent by weight of trimer, in excess of 40 percent by weight of dimer and less than 5 percent of higher polymers, e.g. n is an integer of from about 4 to 8. The foregoing polymethylene polyphenyl polyisocyanates are referred to for convenience hereinafter as "PPI". The foregoing linear type of trimer is produced conventionally in the normal formaldehydeanilino reaction to some extent as the primary aromatic amine and then phosgenated to yield the trimer. The preferred cyclic trimer, the aromatic trissocyanurates, are represented by the general formula:

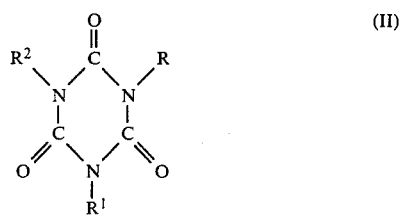

(II)

wherein each of R, $R^1$ and $R^2$ is a hydrogen or isocyanate radical of the formula:

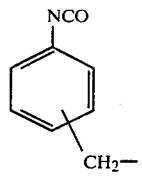

and preferably two, and at least one of R, $R^1$ and $R^2$ is an isocyanate radical. The latter trimer is made by treating PPI, tolyl diisocyanate, or methylene bis phenol isocyanate, ("MDI") the latter usually in combination with about 30 percent to 60 percent by weight of PPI with a basic trimerization catalyst, for example, NaOH. The trimer will provide a significantly preferred isocyanurate where at least two of the substituents represented by R, $R^1$ and $R^2$ are isocyanate moieties because of the cross-linking that may then occur to assist in providing a frangible quality to the substrate. The tolyl diisocyanate used generally is an undistilled blend as well as a distilled mixture with a ratio by weight in either event of eighty parts of 2,4-tolylene diisocyanate and about twenty parts by weight of 2,6-tolylene diisocyanate (referred to hereinafter as "TDI").

The ratio by weight of PPI to TDI, where both are present, is within the range of 1 to 2 and preferably about 1.5 to 2 parts of the former to one part of the latter.

Other illustrative polyisocyanates, which are used alone or in admixture, are diisocyanates of benzene and its homologues such as 1,3- or 1,4-phenylene diisocyanates, 1-alkyl benzene-2,4-, 2,6-, 2,5-, 3,5-diisocyanates, 2,4- and 2,6 diisocyanates, e.g. tolylene, 1-methyl-3,5-diethylbenzene-2,4-diisocyanate, diisopropyl benzene diisocyanate and the like and mixtures thereof.

Diisocyanates of substitution products of benzene may also be used, such as, for example, 1-chlorobenzene-2,4-diisocyanate, dichloro-benzene diisocyanates, 1-nitrobenzene-2,4-diisocyanate, 1-methoxy-benzene-2,4-diisocyanate, azobenzene-4,4'-diisocyanate, diphenylether-4,4' diisocyanate and the like and mixtures thereof. Diisocyanates of naphthalene such as naphthalene-1,4, 1,5- and 2,6-diisocyanates of biphenyl or deriving from diphenylmethyldiphenyl-4,4' diisocyanate, diphenylmethane-4,4'-diisocyanate, diphenyldimethylmethane diisocyanates, benzophenone-3,3'-diisocyanate and the like and mixtures thereof. In addition, diisocyanates of polynuclear ring systems such as 1,5-naphthalene diisocyanates and like sulphur-containing aromatic diisocyanates, such as p,p'-diisocyanatodiphenyl sulfide, triisocyanates and tetraisocyanates, such as 1-methyl-benzene-2,4,6-triisocyanate, triphenyl methane-4,4'4"-triisocyanate 2,2'4,4'-diphenylmethane tetraisocyanate and the like and mixtures thereof are also used.

The polyisocyanates employed herein are characterized by having a functionality of up to 3.5, and preferably from 2.2 to 3.5, thus imparting a friability to the cured thermoset resin which will be consistent with its already significant frangibility but not so much so as to destroy the consistent unity of the finished substrate with or without the cellulose web.

The polyisocyanates employed should have a viscosity of less than 180 centistokes to avoid a viscosity that impairs their usefulness.

The foregoing isocyanates and isocyanurates are employed only in conjunction with an amine-aldehyde condensate wherein the amine precursor or component present in an amount by weight of the total of the amine components employed in formation of the condensate of at least 10 percent, and preferably at least 25 percent, is a hydroxy or polyhydroxy-substituted triazine or alkoxy derivative thereof wherein the alkoxy component contains 1 to 4 carbon atoms. The ether and hydroxy-substituted triazines are the preferred precursors for use in forming the thermoset resins of the invention, in any event, as described elsewhere herein.

A blocking or hindering agent is present in the polyisocyanate, as isocyanate or isocyanurate, or mixtures thereof, incorporated in the amino-aldehyde thermoset resin-forming composition of the invention to eliminate or inhibit premature attack on solvent and thermoset former by the polyisocyanate. The polyisocyanate is included in an amount sufficient to constitute 0.25 percent to 10 percent, and preferably from 5 percent to 10 percent, by weight of the substrate, and preferably cellulose substrate.

Where the blocked aromatic polyisocyanates, as opposed to the aromatic polyisocyanurates, are initially incorporated, a strongly basic trimerization catalyst is incorporated as well in an amount of about 0.01 to 20 percent, and preferably about 10 to 20 percent, by weight of the polyisocyanate.

The catalyst, in addition to a significant basicity, must be both functional and relatively non-volatile so that it does not evaporate from the reaction mixture at a temperature at which the isocyanate or isocyanurate unblocks. Preferred are the preformed blocked isocyanurates as they provide maxima of cross-linking, flame retardancy (compared to the aromatic isocyanates, and a valuable intumescent quality. Illustrative of these well known trimerization catalysts are sodium stearate, sodium adipate, potassium stearate, potassium laurate, lithium adipate, lithium stearate, the corresponding inorganic bases, such as sodium hydroxide, lithium hydroxide, and potassium hydroxide, and the N, N', N'' -tris-dialkylaminoalkyl hexahydrotriazines. The amine catalyst where employed is normally present in an amount on a weight percent basis based on the weight of the polyisocyanate present of two percent to ten percent. Other illustrative trimerization catalysts which may be employed, although significantly less preferred are potassium acetate; sodium formate; sodium carbonate; sodium methoxide; sodium benzoate in dimethyl formoxide; and a large number of other soluble compounds of iron, sodium, lithium, potassium, magnesium mercury, nickel, copper, zinc, aluminum, tin, vanadium, titanium and chromium. Simple tertiary amine catalysts such as triethyl amine, hexahydrotriazine, N-ethyl morpholine and the like are avoided because they are insufficient basis to form trimer or at least sufficient amounts thereof. The known phosphine catalysts tend to yield unstable less functional dimers rather than trimer from TDI and are likewise avoided in the pactice of the invention.

Where the blocked aromatic polyisocyanates or "splitters" with trimerization catalyst are present in the amino-aldehyde condensate reaction mix the polyisocyanates are unblocked during, or commencing in, the drying state or at least during the curing state, and are catalyzed by the catalytic amount of trimerization catalyst present therein to convert the unblocked polyisocyanate to the corresponding polyisocyanurate. When a polyisocyanurate in initially present these latter steps are, of course, unnecesary.

The foregoing blocked polyisocyanates are well known to those skilled in the art and are the product of reaction of the polyisocyanate as characterized hereinabove with certain well known active hydrogen compounds such as phenol, a ketoxime such as acetone oxime, or phenyl ketoxime.

In any event, the isocyanurate, whether formed in situ or in a separate and prior reaction when released at the drying and curing temperatures of the thermosetting condensate, reacts with the free hydroxyl or alkoxy groups of the triazine component of the amino aldehyde thermosetting condensate as well as, where present in a preferred embodiment, the hydroxyl moieties of the cellulose web; and in doing so provides in the reaction of isocyanurate and triazine a highly effective flame retardant for the enclosed elastomeric adhesive layer or layers imposed upon the opposing surfaces of the substrate; and in the reaction with the foregoing triazine and that with the cellulosic web, an anchoring effect is secured which renders the flame retardant extremely resistant to migration, vaporization or undesired sublimation in the absence of flame or actual fire.

It is observed that a mixture of blocked aromatic polyisocyanates and blocked aromatic polyisocyanurates can be used in the practice of the invention and this is, in practice, fortunate for where an alkoxy, for example, a methyl ether or butylether triazine such as melamine aldehyde condensate is employed, an excess of methyl or butyl alcohol is present in the commercially available product so that the blocked isocyanurate or block isocyanate is required to have a higher curing temperature than the vaporization temperature of the alcohol for greatest efficiency.

It is noted that while the foregoing discussion is believed to explain the unique properties inherent in the product secured by the process of the invention, it is not intended that the invention, either the product or the process by which it is obtained, be limited by a particular theory of operation.

The flame retardant, whether that described hereinabove or those appearing hereinafter, is one that will not decompose at the temperatures required for drying or curing the amino-aldehyde condensate or the elatomeric adhesive. Thus, the flame retardants employed herein are those that will not decompose generally at a temperature of less than 350° F.

An unblocked polyisocyanate or isocyanurate may also be used but this is decidedly less preferred and less efficient and, indeed, is substantially inoperative where free hydroxy groups are present in the condensate solution or dispersion in which the isocyanate is incorporated, for example, a water or alcohol medium.

Where isocyanates are employed, accelerators such as ammonium chloride or diammonium phosphate should be omitted from the reaction mixture.

Other reactant flame retardants useful in the practice of the invention but significantly less preferred are the brominated hydrocarbons and particularly the bromhydrins such as 2,3-dibromo-butendiol-1,4, normally utilized substantially in its trans-form although its steric configuration is not critical and may be used in a single isomeric form or mixtures thereof as described illustratively in U.S. Pat. No. 3,919,166 (incorporated by reference herein). Another such bromo hydrin flame retardant is 1,2,5,6-tetrabromo-3,4-dihydroxy hexane, and its stereoisomers described, for example, in U.S. Pat. No. 3,779,953 (incorporated by reference herein). The foregoing compounds are incorporated in the reaction mix of amino-aldehyde prior to curing and integrated into the amino-aldehyde condensate during the curing step; and incorporated therein in an amount sufficient to provide to the polymeric condensate from 4 to 22 percent by weight of bromine. While as an integral part of the thermoset resin of the substrate the reactant brominated alcohols are prevented from migration, they are generally significantly less preferred because of their relative reduced efficiency in contrast to other flame retardants.

A particularly preferred class of what may be conveniently termed flame retardant additives are the ammonium phosphates and the like referred to hereinabove that are useful, in addition, as catalysts and accelerators in the polymerization of the amine aldehydes. These inorganic salts will only manifest a flame retardant character when used in quantities far in excess of those employed to secure a catalytic reaction, however.

Thus, like the conventional accelerators, that is, for example, ammonium chloride, the ammonium phosphates when used as catalysts are employed in a concentration of up to 0.1 percent by weight of the phenol or amine aldehyde condensate.

As a flame retardant, the phosphate, illustratively, ammonium polyphosphate, diammonium phosphate and the like, is incorporated in an amount of from about 60 percent to 150.

Also useful as flame retardant additives in the practice of the invention are the metal oxides such as $Sb_2O_3$, $ZnO$ and $Al_2O_3$. Flame retardants such as hydrated alumina or alumina trihydrate, $Al(OH)_3$ and antimony oxide may be employed individually or in combination, and indeed the known combinations extend to include, for example, the foregoing in admixture with ammonium sulfate, aluminum hydroxide hydrate, $KCl$, $K_2O$, $KNO_3$, $Ca(OH)_2$, $Mg(OH)_2$, $K_2SO_4$ and $Ba(OH)_2$. The foregoing oxides are employed, however, normally only where organo-phosphorus compounds, halogenated organic compounds and halogen-phosphorus containing compounds such as described hereinafter are also being used to impart flame retardancey to the tape.

It is, of course, often expedient to use combinations of reactant and non-reactive acid or inorganic salts, oxides, halogenated organic compounds and phosphorus-containing compounds, as flame retardants herein. Particularly useful flame retardant additives are those compounds incorporating both phosphorus and halogen moieties in a single molecule as, for example, tris (1,3-dichloropropyl) phosphate, tri (2,3-tribromopropyl) phosphate, tetrabromobisphenol A and its carboxylic acid esters, N-(lower alkyl)-tetrabromophthalimides and mixtures thereof.

Additional and illustrative phosphorus-containing organic flame retardants for use herein are compounds encompassed by the following formulae:

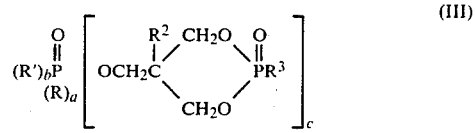 (III)

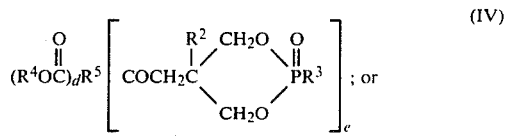 (IV)

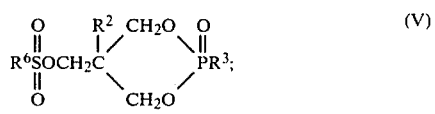 (V)

where in Formula I each of a and b has a value of 0 to 2 inclusive; c is an integer of 1 to 3 and the sum of a, b, and c is 3; each of R and R' is an alkyl, alkoxy, aryloxy, alkaryl, alkaryloxy, aralkyl, aryloxyalkoxy, or aralkoxy radical, wherein each of said alkyl radicals may contain a hydroxyl moiety; and each of said aryl radicals may contain a hydroxy or chlorine group and preferably a single such substituent; $R^2$ is an alkyl, hydroxyalkyl, or aryl group; $R^3$ is either an alkyl or a hydroxyalkyl radical; and, in Formula II, d has a value of 0 to 2 inclusive, e is an integer of from 1 to 3 inclusive and the sum of d and e is 3; each of $R^2$ and $R^3$ has the value recited above with respect to Formula I; $R^4$ is an alkyl, aryl, alkaryl, aralkyl or aryloxyalkyl group wherein the aryl radical may contain chlorine or hydroxyl groups; $R^5$ is an alkyl, alkylene, aryl or arylene radical and the aryl or arylene group may be further substituted by a chlorine or hydroxyl group; and $R^6$ is an alkyl, aryl, alkylaryl or arylalkyl radical, in which any aryl moiety present may be hydroxy-, or chlorine substituted.

Illustrative of the flame retardant compounds coming within the foregoing generic formulae are the following:

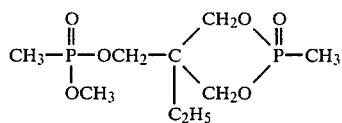 (VI)

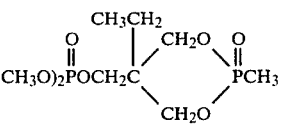 (VII)

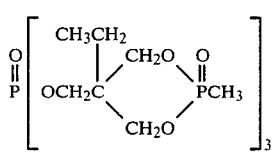 (VIII)

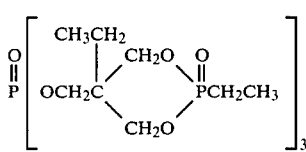 (IX)

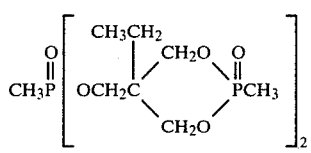 (X)

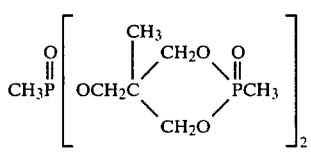 (XI)

-continued
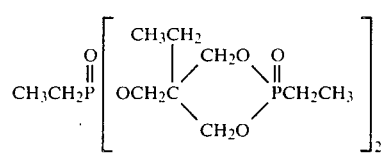 (XII)
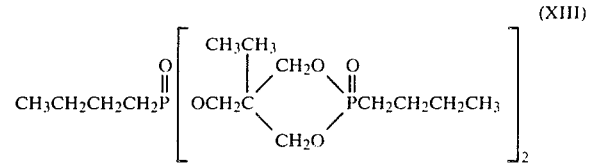 (XIII)
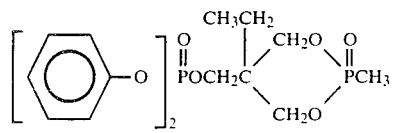 (XIV)
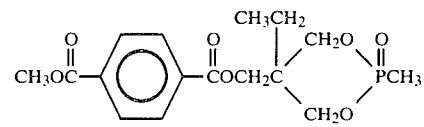 (XV)
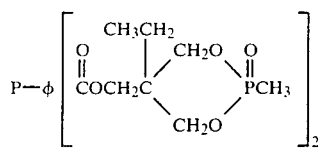 (XVI)
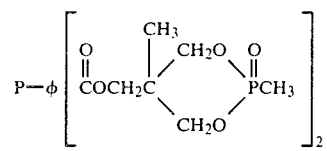 (XVII)
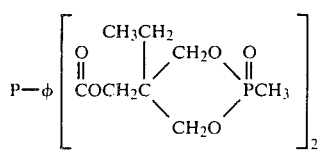 (XVIII)
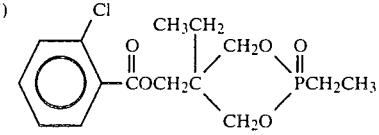 (XIX)
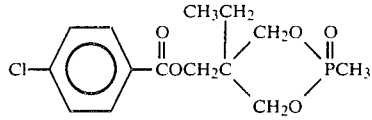 (XX)
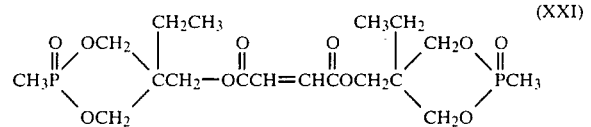 (XXI)
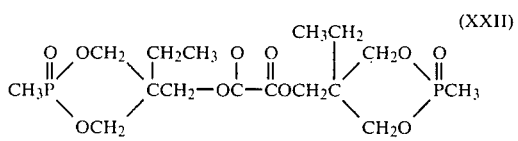 (XXII)
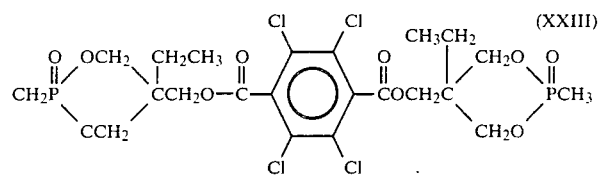 (XXIII)
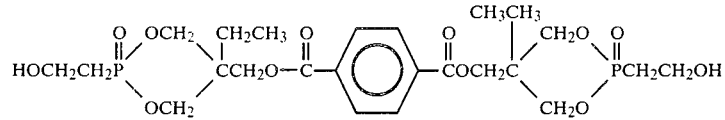 (XXIV)
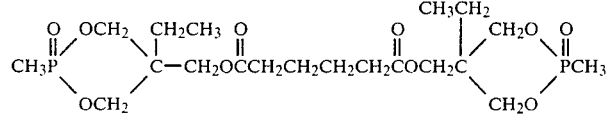 (XXV)
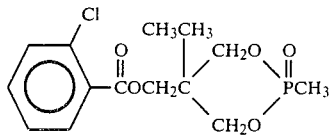 (XXVI)
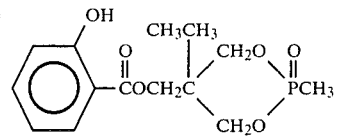 (XXVII)
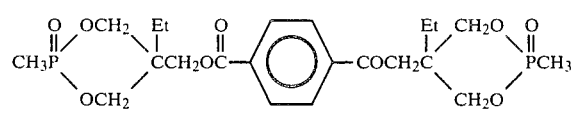 (XXVIII)
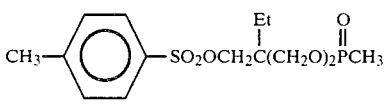 (XXIX)
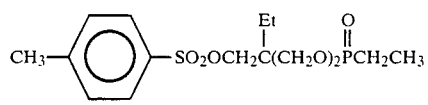 (XXX)

The foregoing illustrative phosphorus-containing compounds contemplated for incorporation in the substrates of the present invention as well as their mode of preparation and use are described in Offenlegunschrift No. 2,255,971 (incorporated by reference herein) of the Federal Republic of Germany bearing an Offenlegungstag of May 24, 1973. Other phosphonates or entirely different flame retardant compounds such as described herein may be utilized in admixture with the foregoing phosphorus-containing compounds.

Other useful flame retardants incorporating both bromine and phosphorus in a single molecule are the brominated phosphoramidates of the general formula characterized in U.S. Pat. No. 4,034,141 (also incorporated herein by reference) as follows:

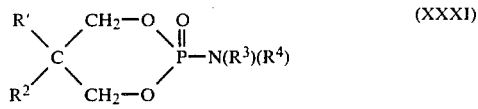
(XXXI)

wherein
$R^1$ and $R^2$ are independently selected from the group consisting of hydrogen, chloro, bromo, or chloro and bromo substituted alkyl of from 1 to 8 carbon atoms; $R^3$ is selected from the group consisting of hydrogen, alkyl of from 1 to 8 carbon atoms, hydroxy substituted alkyl of from 1 to 8 carbon atoms and chloro or bromo or bromo and chloro substituted alkyl of from 1 to 8 carbon atoms;
$R^4$ is independently selected from the group consisting of $R^3$ and a group of the structure:

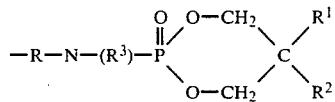

wherein
R is selected from the group consisting of alkylene of from 2 to 8 carbon atoms; phenylene, biphenylene and dicyclohexylene; provided that at least one of $R^1$ and $R^2$ contains a bromine atom; and at least one of $R^3$ and $R^4$ contains a replaceable hydrogen.

Numerous additional phosphorus containing compositions, which impart a flame retardant character to combustible compositions are known in the art as well as their application. See for example U.S. Pat. No. 3,421,923 for description as to various techniques for applying phosphorus containing materials, which description is incorporated by reference herein.

Desirable phosphorus containing compositions that will impart flame retardant character to the tapes of the invention are tetrakis (alpha-hydroxyorgano) phosphonium salts, such as the inorganic salts e.g. halides, sulfates or the like, or salts of organic acids, such as acetic acid, formic acid, oxalic acid and the like, or the product of neutralization of the tetrakis phosphonium compound with an alkalic metal hydroxide or a tertiary amine. Another phosphorus composition is Pyrovatex (trademark of Ciba-Geigy, which has the chemical structure:

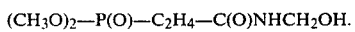

The tetrakis (alpha-hydroxyorgano) phosphonium salts of the subject composition may be further defined as a compound having the formula:

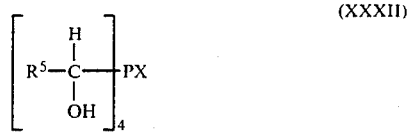
(XXXII)

wherein $R^5$ is selected from the group consisting of hydrogen, a lower alkyl having between about 1 and about 6 carbon atoms, a halogenated lower alkyl having between about 1 and about 6 carbon atoms, lower alkenyl having between about 1 and about 6 carbon atoms, halogenated lower alkenyl having between about 1 and about 6 carbon atoms, aryl having between about 6 and about 10 carbon atoms, halogenated aryl having between about 6 and about 10 carbon atoms, cycloalkyl having between about 3 and about 6 carbon atoms, halogenated cycloalkyl having between about 3 and about 6 carbon atoms, and X is a halogen, such as chlorine, bromine, fluorine or iodine. Typical examples of suitable tetrakis (alpha-hydroxyorgano) phosphonium halide compounds are tetrakis (hydroxymethyl) phosphonium chloride, tetrakis (hydroxymethyl) phosphonium bromide, tetrakis (hydroxyethyl) phosphonium chloride, tetrakis (alpha-hydroxypropyl) phosphonium chloride, tetrakis (alphahydroxybenzyl) phosphonium chloride, tetrakis (alphahydroxymethyl cyclohexyl) phosphonium chloride, tetrakis (alpha-hydroxybutyl) phosphonium chloride and mixtures thereof. The phosphonium compounds may be used in monomer form or in a partially polymerized form, so long as they are still water soluble. For example, tetrakis (hydroxymethyl) phosphonium chloride, which is the preferred phosphonium compound, may be heated to effect partial polymerization before dissolving it in the solution.

The tetrakis (alpha-hydroxyorgano) phosphonium hydroxides useful in the present invention are of the formula:

(XXXIII)

wherein $R^5$ has the above described meaning. The preferred material is tetrakis (hydroxymethyl) phosphonium hydroxide.

The flame retardants for use herein are applied separately to the cellulose substrate where present or are alternatively, added to, dissolved or suspended in, the liquid medium constituting the thermoset precursor.

In applying the composition of the present invention to a cellulose substrate, the preferred technique is the application of a solution such as an aqueous solution. However, other solvents may also be employed providing the compounds of the present invention are soluble therein, such as dimethylformamide (DMF), THF, alkanols, of from 1 to 4 carbon atoms such as methanol, ethanol, butanol, aromatic solvents such as benzene, toluene, xylene or chlorinated hydrocarbons having from 1 to 4 carbon atoms such as carbon tetrachloride and the like.

The compounds of the present invention when applied to the web, should be applied such that there is a wet pick-up add-on by weight of from 70% to 130% resulting in a resin add-on by weight of from about 1% to 50%, preferably about 5 to 35% and, even more desirably, of about 10% to about 25%. When the compounds of the present invention are used in one bath in conjunction with phosphorous compositions that impart flame retardant character, the ratio of the compounds on a weight basis should be from 1-10 to 10-1 of brominated phosphoramidate to other phosphorous containing compositions.

Particularly preferred flame retardant compositions of the present invention are the N-methylol derivatives used in conjunction with tetrakis (hydroxymethyl) phosphonium chloride or hydroxide.

When a solution of tetrakis (hydroxymethyl) phosphonium hydroxide is used to impregnate the cellulose containing material there is an equilibrium between it and tris (hydroxymethyl) phosphine. Such a solution is well known in the art and can be prepared by reacting an aqueous solution of tetrakis (hydroxymethyl) phosphonium chloride with an approximately equimolar quantity of an organic or inorganic base, preferably sodium hydroxide. The pH of the final solution is adjusted to from 7 to 9 and preferably from 7.5 to 8.1. For the purpose of this invention, the active component of the aqueous solution is considered to be tetrakis (hydroxymethyl) phosphonium hydroxide.

The aqueous treating solution may be applied to the cellulosic material in any convenient manner. For example, the solution may be applied by padding, dipping, spraying, and the like. After impregnation, the excess solution is preferably removed from the material by passing the material through squeeze rolls, centrifuging, wringing, or other methods. Although a wet pick-up from about 50 to about 200% may suitably be used, preferably the material contains about an equal weight, i.e., about 100% pick-up, of the treating solution.

Further illustrative of the halogenated flame retardants for use herein are 1,3,5-trichlorobenzene, 1,4-dibromobenzene, hexabromobenzene, hexachlorobenzene, 1-methyl-2,3,4,5,6-pentabromobenzene, and polybrominated biphenyls, polybrominated terphenyls, polychlorinated and poly brominated biphenyl oxides and the like as well as the other flame retardants disclosed in U.S. Pat. No. 3,658,634, also incorporated herein by reference.

Additional flame retardants useful herein are disclosed in U.S. Pat. Nos. 3,658,634; 3,591,507; 4,034,141; 3,764,374; 4,058,466; 3,989,531; 3,432,461; 3,855,134; 3,305,431; and British Pat. No. 1,292,278; the disclosures of which are also incorporated herein by reference. Other useful flame retardants are the ammonium polyphosphates marketed by Monsanto Corporation under the tradename PHOSGARD and the phosphazines.

All of the foregoing may be applied either to the cellulosic web separately before incorporation of the amino-aldehyde condensate therein or in the amino aldehyde composition itself prior to curing thereof or its application to the web.

The thermosetting or thermoplastic elastomeric pressure sensitive adhesive employed in accordance with this invention includes natural, chlorinated, ABS and SB rubber, chloroprene homopolymers and copolymers, acrylic resins, adhesives produced from acrylic acid and acrylic ester monomers and mixtures thereof, and copolymers thereof with other monomers.

These elastomeric adhesives are desirably water-insoluble and, in any event, those for application to one surface thereof are soluble prior to curing only in those solvent systems in which said condensates are insoluble in the cured state.

The preferred pressure-sensitive adhesive formulations applied to either surface and preferably both surfaces of the impregnated substrate or the molecularly homogeneous thermoset resin sheet devoid of a cellulosic web 12 is most desirably a thermosetting or thermoplastic acrylic resin solution polymer. The term "acrylic resin adhesive," as employed in the practice of this invention, is intended to mean these solution polymers and to include, more particularly, those pressure-sensitive adhesive compositions incorporating as the principal adhesive components, resins produced from acrylic acid and acrylic ester monomers and mixtures thereof, and copolymers thereof with other monomers.

Illustrative of these well-known resins are those prepared from monomers of the general formula:

$$CH_2=C\begin{matrix}R\\COOR'\end{matrix} \qquad (XXXIV)$$

wherein R is H or $CH_3$ and R' is hydrogen or an alkyl radical and preferably a lower alkyl radical containing from 1 to 8 carbon atoms, and mixtures of the foregoing including those wherein R' is an alkyl radical of from 1 to 5 carbon atoms.

The foregoing monomers from which the homopolymeric and copolymeric acrylic resins employed herein are prepared are therefore acrylic or methacrylic acid and mixtures thereof. One useful form of pressure-sensitive adhesive is a pure rubbery copolymer of isooctyl acrylate and acrylic acid in a ratio of 94:6 by weight, respectively, prepared as described in U.S. Pat. No. 2,884,126 (U.S. Pat. No. Re. 24,906).

Illustrative esters include methyl acrylate, ethyl acrylate, isobutyl acrylate, methyl methacrylate, ethyl methacrylate, isopropyl methacrylate, n-pentyl acrylate, and butyl methacrylate. The acids polymerize readily; and cross-link upon heat curing, where desired, using minor amounts of cross-linking monomers, e.g. up to 20 percent thereof by weight of acrylic or methacrylic monomer present. Illustrative of these cross-linking monomers are glycidyl methacrylate, hydroxethyl acrylate, and pentaerythritol trimethacrylate. Aqueous dispersions of acrylate and methacrylate polymers and copolymers with acrylic and methacrylic acid also constitute adhesives useful in the practice of this invention. Also capable of application for use as adhesives in the practice herein described are methacrylate polymers which are soluble in a wide range of organic solvents such, illustratively, as chloroform, ethylene dichloride, toluene, mixtures of toluene and acetone or the monomer itself. An organic peroxide, such as tert. butyl hydroperoxide, is present normally where the monomer is used as the solvent, so that the solvent monomer itself may be polymerized. Thus, an illustrative adhesive solution for use in the practice of the present invention is composed of a solution of methacrylic acid and polymethyl methacrylate in methylmethacrylate monomer, with tert. butyl hydroperoxide catalyst. A similar composition encompassed within the acrylic resin adhesive compositions of the invention incorporates acrylonitrile and styrene with a catalyst such as the foregoing organic peroxide.

Aqueous dispersions of acrylate polymers and copolymers, with or without solutions of acrylic acid polymer, including for the purpose of this discussion, methacrylic-acid polymers, or copolymers, as thickeners, are also useful within the compass of this invention. Desirable acrylic resin adhesives, as the term is employed herein, include, in addition, known vinyl acetate-acrylic acid copolymer emulsions. Particularly preferred acrylic resin adhesive formulations for use herein include an acrylic resin blend of about five (5) to twenty-five (25) parts, and most desirably, about fifteen (15) parts, by weight of AEROSET® 1085 modified acrylic resin polymer, (produced by Ashland Chemical Company, Columbus, Ohio) and 100 parts by weight of National Starch acrylic resin No. 30-1219 (manufactured by National Starch and Chemical Corporation, New York, N.Y.). The term, "acrylic resin adhesive" employed herein is intended, in addition, to encompass formulations including the usual adhesive cross-linking agents and other additives known to those skilled in the art.

Further illustrative of the acrylate pressure-sensitive adhesives for use herein and incorporated by reference are those described in U.S. Pat. Nos. 3,532,708; 3,701,758, 3,222,419; 3,008,850; and 3,269,994.

The polychloroprenes, or neoprenes as they are commonly and generically designated, encompass the synthetic elastomers made by polymerization of chloroprene or mixtures of monomers containing principally chloroprene (i.e. 2-chlorobutadiene-1,3) and, for example, styrene, acrylonitrile or isoprene comonomers. These employed herein, preferably, are the cationic chloroprene homopolymeric latexes having, most desirably, an initial pH of about 12. They are extremely viscous, having a Mooney viscosity of about 200 (MS 2.5, min. 215° F.) and are of the gel type. Typical of these latexes are Neoprene 571, Neoprene 842A and Neoprene 601A sold by E. I. du Pont de Nemours, & Co., Wilmington, Del. These latexes are further characterized by a solids content of approximately 50 percent to 60 percent, and preferably about 59 percent. The specific gravity of these latexes is within the range of 1.10 to 1.12, and of the polymer, 1.23. The preferred specific gravity of the latex is 1.12. The Brookfield viscosity of these latexes may vary from 23 to 250 centipoises; the latter is, however, preferred. The latexes employed herein are further characterized by an average surface tension of 38 to 39 dyn/cm and preferably 39 dyn/cm. The preferred latex for use according to the invention is Neoprene 601A.

The latexes are treated prior to use with one or more conventional mixtures of stabilizers, thickeners, resins, tackifiers, preservatives, and anti-foaming agents, as desired.

The mechanism of curing Neoprene differs from that of other elastomers. This is illustrated by the capacity of Neoprene to be cured by heat alone. However, combinations of zinc and magnesium oxides, normally in ratios by weight of 5 to 4 respectively, or magnesium oxide, alone, can be used as a curing agent within the purview of this invention and included in the pressure-sensitive impregnated neoprene composition applied to the web or homogeneous resinous substrate together with such additives, as for example, and most commonly, the di-o-tolyl guanidine salt of dicatechol borate, antimony trisulfide, ethylene thiourea and p',p'-diaminodiphenyl methane. Conventional additives and agents, including plasticizers, are thus embraced, as well, within the expressions "neoprene" and "polychloroprene" as employed herein.

Further disclosure with respect to suitable adhesives for latex addition appear in the Encyclopedia of Polymer Science and Technology, Vol. 8, pp. 164–195, Interscience Publishers (1968) and other adhesive formulations in U.S. Pat. No. 2,844,342.

The cellulosic substrate 12, where employed, is a substantially flat web, preferably a paper tissue, when the tape is used according to the invention in the field of paper making and printing.

Where an impregnated cellulosic substrate is employed, the cellulosic web is any porous, absorbent paper capable of providing tissue and derived, for example, from wood, rag or the like, such as those characterized, illustratively, as mechanical pulp, kraft or rag stock, ground-wood, bleached or unbleached, unbleached sulfite pulp, unbleached sulfate pulp, and the like. A preferred tissue substrate is that composed of bleached Southern Kraft fiber and most desirably bleached Northest Kraft fiber in which the ground-wood is bleached up to eighty percent (80%) by weight. Kraft paper is particularly effective because of its high absorbency.

The elastomeric adhesive coating or ply 16 of the tape 10 will, in the assembled state, be in contact with a conventional release tape or liner 18 for use with pressure-sensitive adhesives, as noted hereinabove; that is, one coated with a standard composition suitable for imparting good release properties to the resulting film. Suitable thermosetting resins and oils useful as release coats are organopolysiloxanes such as those described, for example in U.S. Pat. Nos. 3,575,788 and 3,565,838.

In addition to cellulosic compositions, such as paper, conventional plastic films made of polyethylene, polyvinyl chloride and the like; and textile fabrics made from synthetic fibers, for example, polyamides and orlon may be used to form the release tape. It will be evident that a decorative cover tape may also be used, formed of one or more of these materials to which the properties of quick release have not been imparted and which can, as a result, constitute a product which only requires its application to a wall or other surface. While flexible release backing tapes are preferred, rigid or relatively inflexible backing tapes may be used herein. The winding of the laminated product after preparation for marketing is then omitted; and rigid sections of desired length are simply severed from the product as it is prepared.

Whether a sheet of thermosetting resin is to be employed as a substrate 12 or a cellulosic web invested with the foregoing resin to form the substrate, its frangible character, although greater normally where a homogeneous thermoset resinous sheet is employed, makes the method for preparing a tape coming within the confines of the present invention of particular concern.

One preferred method developed, accordingly, to accommodate the substrate, the frangible quality of which is critical in combination with the flexibility provided by the supportive outer layer or layers of elastomeric pressure-sensitive adhesive, is shown semi-diagrammatically in FIG. 2. In this preferred embodiment, which involves the use of conventional coating and calendering equipment, an elastomeric adhesive coating 16 is applied to the upper surface of a continuous band of liner or release tape 18 suitably coated on both surfaces to facilitate delamination. The application of adhesive is accomplished by conventional coating methods such as from a reservoir 19 equipped with a standard knife coater 20 or knife over-roll or reverse roll to provide an evenly distributed play or lamina, illustratively, of 0.7 mil to 1.5 mil or more as described elsewhere herein and preferably about 1 mil or less. The adhesive of the coated tape is then dried, in, for example, a conventional forced air dryer 24 to flash off excess solvent and the like. The time required to pass through the dryer is normally about 2 minutes and the temperature maintained is conventionally about 125° F. to 250° F., but will be adjusted to a temperature most suitable to the particular elastomer or formulation of elastomer adhesive employed. The adhesive coated release paper is then passed to a curing over 25 maintained at a temperature of about 120° C. (248° F.) or more desirably 135° C. (275° F.) to about 176° C. (350° F.) and preferably about 149° C. (300° F.) to 169° C. (325° F.) for a period of about 2 minutes to 4 minutes. The adhesive-coated release paper is then desirably passed through nip rollers 26 in the embodiment of the invention where a cellulose web is incorporated in the substrate 12. In this latter instance, the cellulosic web (not shown) is introduced in a continuous form into contact with the exposed surface of the cured (or dried) elastomer and pressed into adherence to the surface thereof by the foregoing rolls 26. In either embodiment, that is, with or without the cellulosic web disposed thereon, the adhesive-coated release paper is then passed about cooling rollers 27 and transmitted over a roller 28 revolving in a pan 30 of thermosetting water-soluble or water-dispersible resin such as described hereinabove, so that the exposed surface of the elastomer receives an initial thickness, illustratively, of 3 to 5 mils of thermosetting resin monomer or condensate in aqueous solution or dispersion. As described elsewhere herein a suitable flame retardant composition is conveniently incorporated in the condensate solution or dispersion. Where the cellulosic web is present, it is impregnated with the solution or dispersion. The resin is applied by standard batch or continuous coating and calendering methods.

Alternatively, and indeed preferably, the cellulosic web is first impregnated with thermoset resin by passage through a bath over a roller revolving in a bath 30 of thermosetting water-soluble or water-dispersible resin and cured before passage through the nip rolls 26.

Further, the adhesive coated release tape can, after curing, be deposited on the curred thermoset impregnated cellulosic web.

The thermoset resin, either after deposition and while cooling or when present in the heated bath 30, may desirably incorporate accelerators, such as ammonium chloride, and the like for the purpose of expediting the curing of the thermoset resin. The action of the accelerator can also be slowed by the use of weaker acids. The accelerator, where introduced into the bath 30, is normally added thereto immediately prior to deposition of the resin on the roller 28 in an amount sufficient to cure and effect cross-linking of the thermoset resin, once deposited on the elastomer or impregnated in the cellulosic substrate and subjected to an elevated temperature, to a unified frangible sheet 12.

Where the monomer or condensate is incorporated in a paper web, the web, as described in greater detail hereinafter, in its saturated state, is passed through squeeze rollers optionally, but more desirably, or as in the case where a continuous fiber-free substrate is being produced, through a roller coater in order to remove excess liquid.

Whether as a self-sustained sheet of impregnated web, the substrate is dried in, illustratively, a forced air dryer 31, usually at a temperature of about 53+ C. (125° F.) to 93° C. (200° F.) and as high as about 121° C. (250° F.) for a period of one minute to five minutes.

To secure the elevated temperature required for curing, the substrate is passed to a conventional curing oven 32 that is maintained at a temperature sufficiently high to effect polymerization and cross-linking of the aldehyde-based monomer or low molecular weight condensate. The substrate is usually maintained in the oven for a period of two to four minutes, and the temperature of the oven placed at 60° C. (140° F.) to 105° C. (221° F.) where an azine aldehyde condensate is employed to as high as 137° C. (280° F.) to 177° C. (350° F.)

The cross-linked frangible amino- or phenol-aldehyde resin forming the substrate in its entirety is reduced in its finished state to a thickness of about 0.7 to about 1 mil, or where an impregnated paper substrate is secured, the thickness is from 1 mil to 1.5 mil and preferably about 1.2 mil.

It will be evident that in the event the thermoset resin is not cured until deposited upon the pressure-sensitive resin layer and, where present, the cellulose lamina positioned thereon, the elastomeric pressure-sensitive adhesive upon which the thermoset resin is disposed is a thermoplastic polymer, as preferred, to impart flexibility to the substrate and product tape, it must have a melting point higher than the temperature at which the substrate is dried, cured and cross-linked. It is not necessary that the thermoplastic adhesive have a higher melting point if the thermoset resin is impregnated into the cellulose web cured and the adhesive layer then deposited thereon or vice versa. The impregnation and curing can be accomplished in a separate line and then integrated with that in which the adhesive layer is formed and cured.

A second ply of pressure sensitive adhesive 16, preferably but optionally like that of the first ply of elastomer, described hereinabove, is either applied to another sheet of release tape and applied (in a like thickness to that of the first ply of adhesive) to the exposed surface of the finished substrate or directly to the substrate, illustratively, the adhesive 16 is applied from a reservoir 34 supplied with a knife coater 36. The thickness, and indeed the elastomeric adhesive itself, can be varied within the parameters recited elsewhere herein. Since, desirably, the second ply of adhesive is applied after the substrate has been cured, it is no longer necessary that the adhesive prior to curing, be water-insoluble or insoluble in a system in which the low molecular weight condensate or monomer forming the thermoset resin of the substrate is soluble. In any event, the second ply of adhesive is cured in a manner similar to that described with respect to the first such ply. It is, thus, air dried and cured preferably after application to the substrate, employing, for example, the forced air dryer 38 and curing oven 40, operated at appropriate temperatures such as those recited with respect to the first ply 16 of pressure-sensitive adhesive discussed hereinabove. The tape 10 is then in a preferred embodiment, wound upon itself by the take-up roll 42 to provide a coherent roll of product, and can be readily unwound for use.

In an alternative embodiment preferred particularly where a tape suitable for use in metal stamping operations or mounting in air or spacecraft is involved, the monomer solution, or colloid dispersion, of amino-aldehyde or phenol-aldehyde condensate is applied to a continuous web having a thickness of 1 mil to 3 mils, illustratively, or indeed up to about 21 mils in open width of bleached or unbleached kraft on conventional coating or calendaring equipment as described hereinabove. This paper substrate is desirably but not necessarily subjected to web pretreatment, and is then dried by passage over steam heated drums, after which it is passed through a conventional two or three roll padder, into which the previously prepared aqueous solution or dispersion, of monomer, that is condensate, or low polymer has been run and into which the catalyst, a conventional alkaline or acidic catalyst as appropriate, such as ammonium chloride, sulfuric acid, or diammonium phosphate, or more desirably, magnesium chloride, has been introduced, just prior to introduction of paper substrate into the padder. The effect of the padder is, of course, to squeeze the solution into the fibers and to remove excess surface liquid. The web is then passed through squeeze rolls, optionally, but most desirably, which may be pneumatically controlled in order to remove excess liquid and reduce the residence time of the web in the dryer to which it is committed thereaffter. The impregnated substrate is dried, usually at a temperature of about 53° C. (125° F.), and preferably 93° C. (200° F.), to about 121° C. (250° F.) as described with respect to the embodiment of FIG. 2 hereinabove, for a period of one minute to five minutes. The pressure on the foregoing squeeze rolls is closely controlled to effect the desired amount of wet pickup and thus the amount of condensate absorbed by the fibrous paper web.

The impregenated web or substrate is next passed to a standard curing oven, such as described with respect to the embodiment of FIG. 2, which is maintained at a sufficiently high temperature to effect polymerization and curing of the aldehyde based condensate. The web is usually maintained in the oven for a period of two to four minutes and normally about two minutes, at an elevated temperature such as described hereinabove with respect to the unimpregnated sheet. The resulting web may, if desired, be rinsed thereafter by passage through water, with subsequent drying.

It will be evident that other alternative methods, including batch procedures, can be employed to secure the same result.

Certain of the condensates, the anionic and cationic urea formaldehydes, for example, can be introduced in the cellulose fiber by beater or "web-end" addition to the pulp before the paper-sheet is formed. The nonionic condensates are unsuitable for beater addition as they are not retained by the pulp.

The elastomeric, water-insoluble pressure-sensitive adhesive coating and release paper are, in any event, applied to the substrate prepared by the various methods described above by conventional means well known to the art, as described hereinabove with respect to the embodiment of FIG. 2. By way of further illustration, the elastomeric adhesives may first be applied to a continuous band of release tape by conventional coating methods such as a standard knife coater. The coated tape is again passed through means such as nip rollers or the like to provide an even distribution of adhesive on the release tape, after which the adhesive is dried in, for example, a conventional forced air dryer to flash off excess solvent and the like. The time required to pass through the dryer is normally about two minutes and the temperature maintained is conventionally about 125° F. to 250° F., but will be adjusted to a temperature most suitable to the particular elastomer or formulation of elastomer-containing adhesive employed. The adhesive coated release paper is then passed to a curing oven maintained at a temperature of about 275° F. to about 350° F., and preferably about 300° F. to 325° F. for a period of about two minutes to four minutes. The adhesive-coated release paper is then desirably passed about cooling rollers and transmitted for deposition of the cured adhesion upon the impregnated paper substrate 12. The adhesive-bearing surfaces of the coated tape are adapted to contact the substrate 12 and are compressed against the substrate by appropriate means such as nip rollers. The thickness of the cured adhesive as applied to the impregenated web is in the range of 0.7 mil, or normally about 1.2 mil to 13 mils, as characterized elsewhere herein for use in the various embodiments of the invention described herein. The foregoing process is preferably applied to both sides of the substrate, and for efficiency of operation, this application is accomplished simultaneously. The release tape is normally removed from adherence to the resulting laminate tape product on one of its sides to permit the adhesive surface contacting the exposed release coating of the more advanced internally disposed webs of laminate, the tape to be suitably wound upon itself, to provide a coherent roll of product, which can be readily unwound for use.

The present invention is further illustrated by the following examples, which are not, however, to be construed as limitations thereof. In these examples, as in the remainder of this specification, all references to "parts" or "percentage" are references to parts or percentages by weight unless otherwise expressly indicated.

EXAMPLE I

This example illustrates a preferred embodiment of the invention.

Employing the apparatus and process described with respect to the drawing, an elastomeric water-insoluble pressure-sensitive acrylic resin adhesive formulation composed of a blend of about 15 parts by weight of AEROSET ®1085 modified acrylic resin and 100 parts by weight of National Starch and Chemical Corporation acrylic resin No. 30-1219 is applied to the upper surface of a continuous band of release tape or liner 18 both surfaces of which are coated with a polysiloxane having good release properties. The adhesive is distributed as a ply or lamina 16 on the release tape or liner 18 from a reservoir 19 by a knife coater 20 and distributed in a uniform thickness of about 1 mil. The liner and adhesive are then passed through the dryer 24 maintained at a temperature of about 225° F. at a rate such that they will complete this passage in about 2 minutes. In this manner the adhesive is dried with flash removal of excess solvent before transfer of the release paper and adhesive to the curing oven 25 which is maintained at a temperature of about 325% F. for a period of about 3 minutes. The adhesive (and liner) is then passed, in a kiss-coating procedure, over a feeder roll 28 revolving in a pan 30 of an aqueous amino aldehyde solution (although a dispersion may also be employed) composed of an initially water-soluble low molecular weight condensate or polymer wherein the solution is that delivered to the pan 30 from a tank (not shown) for immediate take-up by the feeder roll 28. The solution in the tank is that prepared from a mixture of 24 pounds of modified methoxy methyl melamine and methoxy methyl urea (marketed under the trade name AEROTEX 23 Special, manufactured by American Cyanide Company, Stamford, Conn.) dissolved in about 50 gallons of water. Ammonium chloride accelerator is separately and directly metered into the foregoing amino aldehyde mixture contained in the pan 30 from a reservoir (not shown) in conventional manner and in an amount of 3 percent by weight of the condensate in the pan at the time of addition thereto so that admixture thereof occurs immediately prior to pick-up by the feeder roll and deposition on the exposed surface of the previously cured water-insoluble pressure-sensitive adhesive ply or coat 16. Deposition of the total solution of amino-aldehyde low molecular condensate from the tank on the exposed continuous length of cured adhesive includes utilization of 10 ounces of ammonium chloride acid catalyst. A pH of 3 to 5 is maintained in the solution in the pan by virtue of the continued replenishment of acid accelerator in the pan.

The deposit of condensate is such that a uniform thickness of about 5 mils of thermosetting amino-aldehyde low polymer is formed initially, whereupon the liner, adhesive and thermosetting amino-aldehyde pass sequentially through a forced air dryer 31 maintained at 225° F., with a residence time therein of about 2 minutes, and a curing oven 32, with a temperature of about 300° F., for a like period of residence. Curing and crosslinking of the condensate occurs in the oven to provide a substantially frangible fully thermoset resinous ply of water-insoluble condensate having a uniform thickness of 0.8 mil. After thermosetting of the amino-aldehyde coating or ply is completed, a further ply of elastomeric pressure-sensitive adhesive (identical to that upon which the amino-aldehyde was initially deposited) is applied thereto. The elastomer is applied to the surface of the thermosetting amino-aldehyde resin ply 12 in a thickness of 1 mil from a reservoir 24 and thereafter excess solvent is removed in the forced air drier 38 and cured in the curing oven 40 in the same manner described with respect to deposition of the first ply of pressure-sensitive elastomer.

The term "cure", or grammatical variations thereof, is intended herein to refer in the case of thermoplastic pressure-sensitive elastomers to the conversion thereof to a dry state; and in the case of thermosetting elastomers to embrace the actual cross-linking of the polymeric adhesive.

EXAMPLE II

This example illustrates a method producing an adhesive tape, according to the invention, employing another substituted triazine-formaldehyde condensate.

The procedure of Example I is repeated substituting the trimethyl ether of trimethylol melamine, a low molecular weight condensate, sold by American Cyanamid Company under the trade name AEROTEX M-3, for the modified methoxyl methyl melamine and methoxy methyl urea condensates of Example I.

EXAMPLE III

This example illustrates a further embodiment of the invention employing a phenol-aldehyde low molecular weight condensate.

The process of Example I is repeated substituting a phenol-formaldehyde low molecular condensate prepared by standard means and employing three moles of formaldehyde for each mole of phenol. The condensate is dissolved in a composition containing, in addition, 50 weight percent of water and 25 weight percent of dioctyl phthalate plasticizer and replaces the melamine condensate of Example I in the pan 30 of FIG. 2 for deposit after addition of catalyst thereto.

EXAMPLE IV

This example illustrates the method of producing an impregenated tissue paper substrate employing a triazine resin according to the invention.

A resin-treating bath is first prepared employing twenty-four (24) pounds of AEROTEX 23 Special triazine condensate (i.e. methoxy methyl melamine and methoxy methyl urea blend), a water-soluble low polymer manufactured by American Cyanamid Company of Stamford, Conn., which is diluted with water to approximately fifty gallons. Water is then added to this mixture until a total volume of 75 gallons is reached. Immediately prior to introduction of the foregoing mixture from the mixing vessel into a padder, ten ounces of ammonium chloride are added and the pH of the liquid adjusted to about 4 with slow stirring of the mixture.

A continuous tissue web of blended Bleached Southern Kraft fiber having a basis weight of about ten pounds and a thickness per sheet of about 4 mils in the dry unimpregnated state that has been first subjected to conventional wet pretreatment and dried is then passed into the padder into which the impregnating liquid described above has previously been run. The resulting impregnated tissue is passed through the padder and is thereafter squeezed between pneumatically controlled rubber rolls in order to remove the excess liquid and at the same time insure penetration and even distribution of the impregnating liquid throughout the fiber structure of the tissue. The pressure on the rolls is set to allow a wet pick-up of about ten percent of water-soluble resin condensate based on the dry weight of the paper.

The treated paper is then dried by a forced air dryer maintained at 225° F. and then passed through a conventional curing oven, in which the cloth is exposed for about two minutes to a temperature of about 300° F. It is unnecessary to rinse the resulting impregnated substrate.

A water-insoluble elastomeric pressure-sensitive adhesive is then applied to both surfaces of the impregnated substrate from a release tape brought into contact with both surfaces of the substrate, and described in Example VI appearing hereinafter.

EXAMPLE V

This example illustrates the method of producing an impregnated tissue web according to the invention employing a modified urea-formaldehyde monomer free of any melamine condensate.

The procedure of Example IV is repeated using the same equipment, but substituting for the AEROTEX 23 Special of Example I a water solution of modified urea-formaldehyde monomer sold by Rohn and Haas Company, Philadelphia, Pa. under trade name and grade designation of Rhonite R-1, diluted further with water to approximately 50 gallons. In addition, 8 ounces of Triton NE emulsifying agent are added to the solution, and the mixture further diluted until a total volume of about 75 gallons is obtained. Finally, 10 ounces of diammonium phosphate are added, while the liquid mixture is stirred. The impregnating mixture is then introduced into a conventional padder and the remainder of the process of Example IV is repeated as indicated above, using a web substrate composed of a blend of Bleached Northeast Kraft fibers having a basis weight of about 9.5 and a thickness in the dry impregnated state of about 2.5 mils per sheet.

A water-insoluble elastomeric pressure-sensitive adhesive is then applied to both surfaces of the impregnated substrate in the manner described in Example VI appearing hereinbelow.

EXAMPLE VI

This example illustrates the application of thermosetting and thermoplastic pressure sensitive adhesive formulations to the impregnated substrates prepared in Examples IV and V.

Each of the elastomeric, water-insoluble adhesive compositions described in formulations A to D appearing herein below are applied to a continuous band of release paper of standard properties coated with a conventional organopolysiloxane suitable for imparting good release properties to the resulting tape in a thickness of about 2.5 mils by means of a knife coater. The coated release tape is then passed to an oven to effect polymerization of, or in the case of the thermosetting adhesive compositions, cross-linking within, the acrylic resin polymer. This curing or cross-linking is accomplished at a temperature of about 300° F. The adhesive-coated release tape is then passed about conventional cooling rollers, and the adhesive-coated face of the release tape is then brought into contact with the under surface of the impregnated substrate of each of Examples IV and V. The same acrylic resin formulation is applied directly to the upper surface of the web substrate in the same thickness described above with respect to that applied to the under surface and otherwise cured under like conditions of temperature and residence time. The elastomeric coated substrate constituting the laminated pressure-sensitive adhesive tape according to the invention is then wound upon itself to provide coherent rolls of the product.

The elastomeric adhesive compositions referred to hereinabove as formulations A to D are as follows (wherein reference to parts is to parts by weight:

| | Parts |
|---|---|
| FORMULATION A | |
| Modified acrylic resin polymer, AEROSET ® 1085 | 15 |
| Acrylic resin National Starch 30-1219 | 100 |
| FORMULATION B | |
| Composition | |
| Rubbery polymer of ethyl acrylate, butyl acrylate and chloroethyl vinyl ether | 50.0 |
| Hydrogenated ester gum | 20.0 |
| Polyterpene resin | 5.0 |
| Condensation polymer of dihydric alcohol and dibasic acid | 10.0 |
| Tetraethylene glycol ester of 2-ethyl hexanoic acid | 2.0 |
| Precipitated silica | 10.0 |
| Alkylate polyhydroxy phenol | 3.0 |
| FORMULATION C | |
| Compositon | |
| Butadiene-styrene copolymer (butadiene-styrene ratio 70:30 Mooney value 50) | 50 |
| Smoked sheet | 50 |
| Ester of hydrogenated rosin | 50 |
| Polymerized trimethyldihydroquinoline | 2 |
| Petroleum oil | 2.0 |
| FORMULATION D | |
| Composition | |
| Polyisobutylene high polymer, solid | 100 |
| Polyisobutylene polymer, viscous liquid | 70 |

-continued

| | Parts |
|---|---|
| Toluene | 520 |

EXAMPLE VII

This example illustrates a further embodiment of the invention.

The process of Example I is repeated substituting, for the pressure-sensitive acrylic resin adhesive thereof, Formulation B of Example VI.

EXAMPLE VIII

This example illustrates another embodiment of the invention employing the process of Example I in which an alternative elastomeric adhesive is used.

The process of Example I is repeated substituting, for the pressure-sensitive acrylic adhesive thereof, Formulation D of Example VI.

EXAMPLE IX

This example illustrates the incorporation of an accelerator for curing of the condensate in an amount sufficient to provide an effective flame retardant laminate.

The procedures of Example I and III are repeated substituting, in each instance, for the ammonium chloride accelerator, three times its weight of diammonium phosphate. Comparative laboratory tests made with the test pieces of the substrate of Examples I and III containing ammonium chloride and Examples IX and X containing ammonium phosphate in an amount three times by weight of said ammonium chloride, both employed as curing agents for the condensates, demonstrate that the test samples of Examples IX have a limiting oxygen index measure of resistance to ignition, ten percent better than that of the substrates of Examples I and III.

EXAMPLE XI

This example illustrates the effective flame retardancy of inorganic salts useful also as accelerators.

The procedure of Example II is repeated, substituting ammonium chloride with a stirred suspension of ammonium polyphosphate (available commercially from Monsanto Chemical Co. as Phos Chek 30) to yield a finished release layer-adhesive-thermoset sandwich or laminate in which the thermoset substrate is more brittle than that of Example II. When similarly cut samples from Example II and Example XI are exposed to the same candle flame, a sample of Example II ignites and drips glowing embers while the sample of Example XI intumesces and is significantly more difficult to ignite.

EXAMPLE XII

This example illustrates the addition of an organic phosphorus flame retardant to the laminate prepared in accordance with Example II.

The procedure of Example II is repeated, supplementing the procedure therein described by incorporation in the solution of AEROTEX M-3 condensate present in the pan or bath 30 an emulsion of tris(2,3-dibromopropyl)phosphate and micropulverized antimony trioxide such that there is a weight ratio of condensate to organophosphate to antimony oxide, respectively of 10:1:0.3. This composition yields a laminate within the scope of the invention wherein the substrate is less frangible than that of Example XI but more frangible than that of Example II, and the resistance to ignition is significantly superior to that of the substrate of Example II.

EXAMPLE XIII

This example illustrates the use of a furthe organophosphorus-containing compound as a flame retardant in the practice of the invention.

The procedure of Example IV is repeated with the addition to the impregnant solution containing the AEROTEX 23 Special triazine condensate, immediately prior to introduction of the ammonium chloride and adjustment of the pH of the solution, of a solution of tetra(hydroxy-methyl)phosphonium chloride in water, marketed by Hooker Chemicals under the trade name THPC in an amount sufficient to cross-link with about ten percent of the triazine condensate inducing increased frangibility and flame retardancy in the substrate. The impregnated cellulosic substrate is more brittle or frangible than that of Example IV, resists ignition more successfully than does the substrate of Exhibit IV, and intumesces on exposure to flame.

EXAMPLE XIV

This example illustrates a variation of the procedure described in Example XIII.

The procedure of Example XIII is repeated incorporating 20 percent of thiourea as a reactant by weight of the tetra(hydroxymethyl)phosphonium chloride employed. The product substrate manifests significantly greater frangibility and resistance to ignition than does the substrate of Example IV while intumescing upon exposure to flame.

EXAMPLE XV

This example illustrates a variation of the procedure described in Example XIV immediately preceding.

The procedure of Example XIV is repeated substituting for the thiourea incorporated therein, the mole equivalent of dicyandiamide. Like the impregnated substrates of Examples XIII and XIV, the product substrate of the present example manifests greater flame retardance in the form of resistance to ignition while manifesting an intumescence on exposure to flame.

EXAMPLE XVI

This example illustrates the addition of another organophosphorus flame retardant agent to the condensate used in forming the impregnated substrate of Example IV.

The procedure of Example IV was again repeated with incorporation in this instance in the dilute aqueous solution, i.e. 75 gallons, of AEROTEX-23 Special triazine condensate, of a chloroform solution containing 2.4 pounds of polyphosphonitrile chloride with good agitation. The pH of the stirred mixture is adjusted to about 4 by use of aqueous ammonia when the nitrilic chloride addition is complete. This addition replaces the addition of ammonium chloride accelerator and adjustment of the pH described in Example IV. The condensate bath present in the pan 30 requires continued stirring before application to the roll 28. The cellulosic substrate is advanced more slowly in the practice of this example than in Example IV so as to permit the product additional time to cure. The resulting product is frangible and flame retardant.

This example utilizes "blocked" isocyanates to secure flame retardancy.

A commercially available mixture of 80:20 2,4:2:6-toluene diisocyanate ("TDI") is converted by known reaction with phenol to the bis-phenylcarbanilate mixture and the resulting blocked TDI is dissolved in the low molecular weight trimethyl ether of trimethylol melamine marketed by American Cyanamid Company under the trade name AEROTEX M-3, in the ratio of one pound of blocked TDI to 10 pounds of tri(methoxymethyl)melamine. The foregoing solution is substituted for the untreated AEROTEX M-3 of Example II and the procedure of the latter example repeated. The adhesive coated release tape is advanced over the roller 28 in the kiss-coating step employed to apply the condensate to the exposed adhesive somewhat more slowly than that provided in Example II to permit for full uncoupling and addition of the blocked isocyanates. The final product is more ignition-resistant than the laminate of Example II.

EXAMPLE XVII

This example illustrates a method for enhancing the frangibility of the laminate secured in Example XVI.

The process of Example XVII is repeated by addition to the "blocked" isocyanate-melamine solution of Example XVI, in separate samples, formaldehyde and paraformaldehyde to resinify the liberated phenol.

In a third sample, the trimethyl ether of oxymethyl melamine, AEROTEX M-3, is replaced by urea. In all three instances the product manifests an ignition-resistant flame retardancy equivalent to that of Example XVI with an enhanced frangibility.

It is noted, that urea may be used in admixture with the oxymethyl melamine to secure a superior flame retardant laminate as well.

Further, when a blocked isocyanate resin forming condensate mixture such as that of Example XVI is heated in the presence or absence of a cellulose substrate at the temperatures recited expressly in Example I, by way of illustration, but in the presence of a trimerizing catalyst such as the involatile isocyanate-trimerizing catalyst, tris-dimethyl amino methyl phenol, marketed by Rohm & Haas under the trade name DMP-30 or tris(dimethylaminomethyl)hexahydrotriazine, or the less efficient sodium stearate or the like, the isocyanate groups first unblock, then trimerize to form a heat stable isocyanurate which causes further cross-linking of the substrate, with consequent added resistance to ignition, and generation of intumescence when overheated or exposed to flame.

The tapes of the invention incorporating the foregoing elastomeric adhesive and frangible substrates are markedly superior, particularly with respect to delamination, reduced thickness and a combination of frangibility and reduced edge-tear resistance to that of tapes prepared by conventional methods. The resulting tapes have significant utility, as indicated, as splicing means, and most particularly, flying splices, in the paper-making and printing industries.

The tapes of the invention and particularly those incorporating a cellulosic substrate are, as noted, of particular utility in stamping operations involving a plurality of superimposed planar sheets held in position by the foregoing tape because the cellulosic substrate has sufficient thickness to accommodate irregular surfaces without being so material as to result in peripheral exudation of the tape components in the stamping operation. At the same time these tapes manifest a frangibility that permits a clean and easily obtained cut by the punch dies without their being gummed up in the process as would occur with adhesive tape having a Mylar, nylon or cellulosic substrate unimpregnated in accordance with the invention. The avoidance of crowning of the stamped products, normally metal products, although the tapes have application to engineering plastics, as well, is a particular and unexpected advantage of the invention.

Another and particularly significant utility of the tapes, of the invention, and particularly those incorporating a cellulose substrate is, as described elsewhere herein, their application as mounting tapes, especially those tapes prepared as described herein having a durable flame retardancy at widely disparate temperatures and pressures.

The advantages of a flame retardant tape in which the flame retardant will inhere for extended periods of time or permanently and will, with the other properties of the tape, survive rigorous variations in temperature and pressure has particular, but not exclusive, application to air, marine and space craft. In aircraft, the tape would be used, by way of elaboration, and illustration, between the cabin wall, which may be made of poly(vinyl chloride), polyester of the like and the metal of the skeleton of fuselage of the plane. It is feasible to include flame retardants, for example, in either, or both of the exterior plies of the tape employed as well as in the substrate, in accordance with the present invention, but as indicated elsewhere herein, this incoporation in the adhesive has material disadvantages. Thus, where, for example, the preferred elastomeric pressure-sensitive adhesives are used, the most effective adhesives for incorporation therein tend to act as plasticizers, decreasing the effectiveness of the adhesive while abbreviating the effective life of the tape. The plasticizing flame retardant will itself have a term of effectiveness of comparative brevity and the most widely employed of these flame retardant compositions, e.g. tris(2,3-dibromopropyl)phosphate, has a significant toxicity to humans and mammals alike. It is noted, too, as indicated hereinabove, that certain of the polymeric flame retardants incorporated in the frangible substrate of the invention, notably the hindered triisocyanurates and hindered polymethylene polyphenyl polisócyanates ("PPI" or "PAPI") intumesce normally at temperatures above the decomposition temperature of the adhesives forming the outer plies of the tape, a property utilizable where it is desired to obliterate or seal a passage through which flame and heat might be readily conducted and which would exist upon decomposition of the tape but for the intumescent flame retardant.

It will be evident from the foregoing that a new pressure-sensitive adhesive sheet material or tape including a novel substrate therefore, has been provided by the present invention. It will be evident, too, that the terms and expressions which have been employed are used as terms of description and not of limitation. There is no intention in the use of such terms and expressions of excluding equivalents of the features shown and described or portions thereof and it is recognized that various modifications are possible within the scope of the invention claimed.

What is claimed is:

1. A product laminate having a thickness of up to about 21 mils; a frangible substrate consisting essentially of a cured thermoset resin prepared from an initially water-soluble or water-dispersible amino-aldehyde condensate, phenol aldehyde condensate or mixture thereof; and a water-insoluble elastomeric pressure sensitive adhesive secured to at least one side of said substrate, said aldehyde-based substrate and said pressure-sensitive adhesive having the ability to function as an adhesive tape.

2. A product as claimed in claim 1 wherein said product is an adhesive tape in which said frangible substrate is present as a single ply and said pressure-sensitive adhesive is secured to both sides of said substrate.

3. A product as claimed in claim 1 wherein said cured thermoset resin is prepared from a mixture of amino-aldehyde resin and phenol aldehyde resin condensates.

4. A product as claimed in claim 1 wherein said cured thermoset resin is prepared from an amino aldehyde condensate.

5. A product as claimed in claim 4 wherein said amino component of said amino-aldehyde condensate is an azine or carbamide moiety.

6. A product as claimed in claim 5 wherein said azine moiety is a diazine or a triazine.

7. A product as claimed in claim 6 wherein said azine moiety is a triazine.

8. A product as claimed in claim 7 wherein said azine moiety is a methyl ether of trimethylol melamine.

9. A pressure-sensitive adhesive tape as claimed in claim 7 wherein said azine moiety is a tris methoxy methyl melamine, hexamethoxy methyl melamine or tris hydroxymethyl tris methoxy methyl melamine or a mixture thereof.

10. A product as claimed in claim 1 wherein said cured thermoset resin is prepared from a phenol aldehyde condensate.

11. A product as claimed in claim 1 wherein said aldehyde-based condensate is a thermosetting s-triazine formaldehyde condensation product.

12. A product as claimed in claim 11 wherein said aldehyde-based condensate is a thermosetting melamine formaldehyde condensation product.

13. A product as claimed in claim 1 wherein said aldehyde-based condensate is a thermosetting urea formaldehyde condensation product.

14. A product as claimed in claim 1 wherein said aldehyde-based condensate is a thermosetting resorcinal-formaldehyde condensation product.

15. A product as claimed in claim 1 wherein said aldehyde-based condensate is a thermosetting phenol formaldehyde condensation product.

16. A product as claimed in claim 1 wherein said adhesive is a thermoplastic resin.

17. A product as claimed in claim 1 wherein said adhesive is a thermosetting resin.

18. A product as claimed in claim 1 wherein said adhesive is an acrylic resin adhesive.

19. A product as claimed in claim 1 wherein said adhesive is an elastomeric-polymerized chloroprene pressure-sensitive adhesive.

20. A product as claimed in claim 1 wherein said substrate has a thickness of up to 13 mils.

21. A product as claimed in claim 20 wherein said product is an adhesive tape adapted for use as a splicing means and has a substrate with a thickness of about 1.7 mil to about 4.0 mils.

22. A product as claimed in claim 20 wherein said product is an adhesive tape adapted for use as a retaining member between superimposed metal sheets in a stamping or die-punch operation wherein said substrate has a thickness of from about 4 mils to about 11 mils.

23. A product as claimed in claim 1 suitable for use as a mounting tape at a temperature of from about −40° F. to about 158° F. wherein there is incorporated additionally in said substrate a flame retardant composition.

24. A laminate product having a thickness of up to about 21 mils and including a frangible substrate consisting essentially of a fibrous cellulosic web impregnated with a cured, thermoset resin of an initially water-soluble or water-dispersible thermosetting resinous aldehyde-based condensate, said condensate being deposited in said web prior to curing thereof; and a water-insoluble elastomeric pressure-sensitive adhesive adherent to at least one side of said substrate; said laminate having the ability to function as an adhesive tape.

25. A product as claimed in claim 24 wherein said aldehyde-based condensate is a thermosetting urea formaldehyde condensation product.

26. A product as claimed in claim 1 or claim 24 wherein said substrate incorporates, as an additional component, a flame retardant composition.

27. A product as claimed in claim 26 wherein said flame retardant is an organic brominated compound.

28. A product as claimed in claim 26 wherein said flame retardant is an organophosphorus compound.

29. A product as claimed in claim 26 wherein said flame retardant component comprises an aryl glycidyl ether.

30. A product as claimed in claim 26 wherein said flame retardant component is 9,9-fluorylidene-bis(4-phenyl glycidyl ether).

31. A product as claimed in claim 26 wherein said substrate consists essentially of a cured thermoset resin prepared from an amino aldehyde condensate and said substrate includes as a flame retardant compound a blocked organic polyisocyanate that is unhindered at a temperature of about 250° F. or higher.

32. A product as claimed in claim 31 wherein said polyisocyanate includes a strongly basic trimerization catalyst.

33. A product as claimed in claim 32 wherein said basic trimerization catalyst is an alkali metal salt of a monocarboxylic acid, an alkali metal salt of a dicarboxylic acid, or an alkylaminoalkyltriazine.

34. A product as claimed in claim 33 wherein said basic trimerization catalyst is an alkali metal salt of said monocarboxylic acid and is present in an amount of up to about 20 percent by weight of said polyisocyanate.

35. A product as claimed in claim 33 wherein said trimerization catalyst is an alkylaminoalkyltriazine and is present in an amount of up to about 10 percent by weight of said polyisocyanate.

36. A product as claimed in claim 31, wherein the amino constituent of said condensate is an azine, said polyisocyanate is an aromatic polyisoiyanate and said condensate is deposited in a cellulosic web prior to curing of said condensate.

37. A product as claimed in claim 36 wherein the amino component is present in said condensate in an amount by weight of at least 10 percent.

38. A product as claimed in claim 37 wherein said amino component is present in said condensate in an amount of at least 25 percent by weight.

39. A product as claimed in claim 37 wherein said condensate is deposited in a cellulosic web prior to curing thereof and said blocked polyisocyanate is present in an amount of from 0.25 percent to 10 percent by weight.

40. A product as claimed in claim 36 wherein said polisocyanate has a viscosity of less than about 180 centistokes.

41. A product as claimed in claim 36 wherein said aromatic polyisocyanate is a mixture of blocked polymethylene polyphenyl polyisocyanates wherein said polyisocyanates are of the general formula:

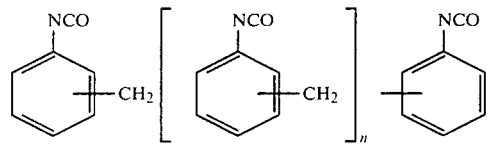

wherein n is an integer from 1 to 8; and
where, in at least 40 percent of said poliisocyanate, n has a value of 1.

42. A product as claimed in claim 36 wherein said azine is an s-triazine.

43. A product as claimed in claim 36 wherein said azine is the trimethyl ether of trimethylol melamine.

44. A product as claimed in claim 36 wherein said polisocyanate has a functionality of up to 3.5.

45. A product as claimed in claim 44 wherein said polisocyanate has a functionality of form about 2.2 to about 3.5.

46. A product as claimed in claim 31 wherein the amino component of said condensate is a hydroxy or polyhydroxy substituted triazine or alkoxy derivative thereof.

47. A product as claimed in claim 46 wherein said alkoxy derivative of said amine component contains from 1 to 4 carbon atoms.

48. A product as claimed in claim 31 wherein said condensate is a mixture of hexamethoxy methyl melamin formaldehyde and methoxy methyl urea formaldehyde.

49. A product as claimed in claim 26 wherein flame retardant component is a blocked polyisocyanaurate wherein said polyisocyanurate is of the formula:

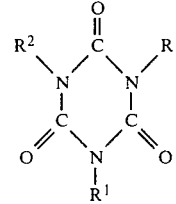

wherein each of R, R¹ and R² is a hydrogen atom or an isocyanate radical of the formula:

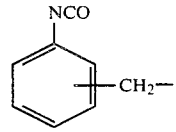

and at least one of said substituents, R, R¹ and R² is an isocyanate radical as so defined.

50. A product as claimed in claim 49 wherein at least two of said substitutents R, R¹ and R² are isocyanate moieties.

51. A product as claimed in claim 1 wherein each ply of said adhesive coating present has a thickness of up to 4 mils.

52. A product as claimed in claim 1 wherein said amino component of said condensate is a carbamide.

53. A product as claimed in claim 1 wherein said amino aldehyde condensate is a mixture of a triazine-aldehyde condensate and a carbamide-aldehyde condensate.

54. A product as claimed in claim 26 wherein said flame retardant composition has a decomposition temperature in excess of 350° F.

55. A product as claimed in claim 26 wherein said flame retardant composition comprises alumina trihydrate.

56. A product as claimed in claim 26 wherein said flame retardant composition comprises alumina trihydrate and a metal oxide.

57. A product as claimed in claim 56 wherein said metal oxide comprises antimony oxide.

58. A product as claimed in claim 26 wherein said flame retardant composition comprises an organophosphorus compound.

59. A product as claimed in claim 58 wherein said organophosphorus compound comprises a tetrakis (alpha hydroxyorgano) phosphonium hydroxide.

60. A product as claimed in claim 58 wherein said organophosphorus compound comprises an N-lower alkyl-tetrabromophthalimide wherein said lower alkyl contains from 1 to 6 carbon atoms.

61. A product as claimed in claim 58 wherein said organophosphorus compound is selected from the formulae:

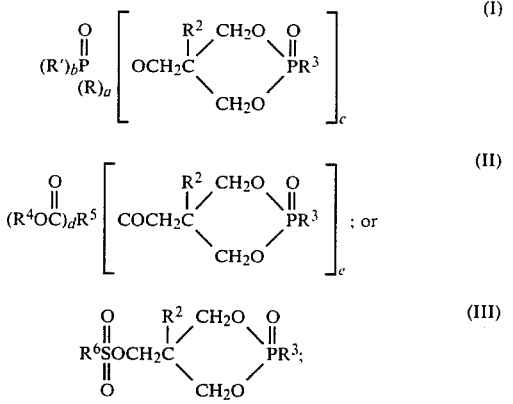

wherein each of a and b has a value of 0 to 2 inclusive; c is an integer of from 1 to 3 and the sum of a, b and c is 3; each of R and $R^1$ is an alkyl, alkoxy, aryloxy, alkaryl, alkaryloxy, aralkyl, aryloxy alkyloxy, or aralkoxy radical wherein each of said alkyl moieties is unsubstituted or hydroxy substituted; and each of said aryl radicals is unsubstituted or hydroxy-or chlorine-substituted; $R^2$ is an alkyl, hydroxyalkyl or aryl radical; $R^3$ is an alkyl or hydroxy alkyl radical; d has a value of from 0 to 2 inclusive, e is an integer of from 1 to 3 inclusive and the sum of d and e is 3; $R^4$ is an alkyl, aryl, alkaryl, aralkyl, or aryloxyalkyl group, wherein said aryl moiety is unsubstituted, or chlorine- or hydroxy-substituted; $R^5$ is an alkyl, alkylene, aryl or arylene radical; and each of said aryl and arylene radicals is unsubstituted, or chlorine or hydroxy-substituted; and $R^6$ is an alkyl, aryl, alkaryl, aralkyl, or aryloxy alkyl group wherein any aryl moiety present is unsubstituted, hydroxy-substituted or chlorine substituted.

62. A product as claimed in claim 58 wherein said organophosphorus compound comprises a compound of the formula:

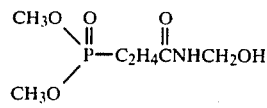

63. A product as claimed in claim 58 wherein said organophosphorus compound comprises a tetrakis (alpha-hydroxyorgano) phosphonium compound of the formula:

$$(R^5CHOH)_4PX$$

wherein $R^5$ is hydrogen, a lower alkyl radical, a halogenated lower alkyl radical, a lower alkenyl radical, a halogenated lower alkenyl radical, and aryl radical, a halogenated aryl radical, a cycloalkyl radical or a halogenated cycloalkyl radical, and X is a halogen atom.

64. A product as claimed in claim 58 wherein said organo-phosphorus compound is a tetrakis (alpha-hydroxyorgano) phosphonium hydroxide of the formula:

$$(R^5CH(OH))_4POH$$

wherein $R^5$ is hydrogen, a lower alkyl radical, a halogenated lower alkyl radical, a lower alkenyl radical, a halogenated lower alkenyl radical, an aryl radical, a halogenated aryl radical, a cycloalkyl radical or a halogenated cycloalkyl radical.

65. A product as claimed in claim 58 wherein said organophosphorus compound is of the formula:

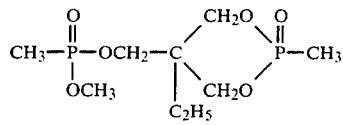

66. A product as claimed in claim 26 wherein said flame retardant composition comprises a brominated phosphoramidate of the formula:

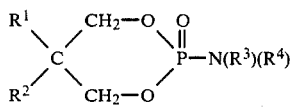

wherein each of $R^1$ and $R^2$ is selected from a hydrogen, chlorine, bromine or chlorine or bromine substituted alkyl, or mixture thereof, containing from 1 to 8 carbon atoms; and each of $R^3$ and $R^4$ is a hydrogen, or an alkyl, hydroxy alkyl or halogen-substitued alkyl group wherein said alkyl group contains from 1 to 8 carbon atoms and said halogen substituent or substituents are bromine, chlorine or mixtures thereof.

67. A product as claimed in claim 26 wherein said flame retardant composition comprises the glycidyl diether of tetrabromo bis phenol A.

68. A product as claimed in claim 26 wherein said flame retardant composition comprises a brominated phosphoramidate of the formula:

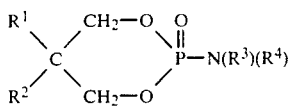

wherein
R[1] and R[2] are independently selected from the group consisting of hydrogen, chloro, bromo, or bromo and chloro, substituted alkyl of from 1 to 8 carbon atoms; R[3] is selected from the group consisting of hydrogen, an alkyl radical of from 1 to 8 carbon atoms, or a hydroxy substituted alkyl radical of from 1 to 8 carbon atoms; R[4] is independently selected from the group consisting of R[3] and a group of the structure:

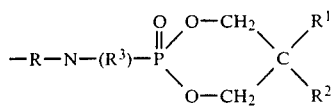

wherein
R is selected from the group consisting of an alkylene radical of from 2 to 8 carbon atoms, a phenylene, biphenylene or dicyclohexylene radical; provided that at least one of R[1] and R[2] contains a bromin atom;
and at least one of R[3] and R[4] contains a replaceable hydrogen.

69. A product as claimed in claim 24 wherein said condensate is an amino aldehyde condensate.

70. A product as claimed in claim 26 or 69 wherein said flame retardant is an ammonium phosphate or a polymer thereof.

71. A product as claimed in claim 70 wherein said ammonium phosphate comprises diammonium phosphate.

72. A product as claimed in claim 70 wherein said ammonium phosphate comprises ammonium polyphosphate.

73. A product as claimed in claim 69 wherein said impregnated cellulosic web has a tensile strength of about one pound per square inch.

74. A product as claimed in claim 69 wherein the cellulosic web of said substrate is, in its dry unimpregnated state, an absorbent kraft tissue having a basis weight of 9 to 10 pounds.

75. A product as claimed in claim 69 wherein said condensate is deposited in a fibrous cellulose web prior to curing, said condensate includes a hindered aromatic polyisocyanate or a hindered polyisocyanurate, or mixtures thereof adapted to unblock at about 250° F. or in excess thereof.

76. A product as claimed in claim 75 wherein said hindered aromatic polyisocyanate regenerates to the corresponding polyisocyanate upon blocking and is converted to the corresponding trimer thereof upon curing of said condensate.

77. A product as claimed in claim 24 wherein said aldehyde condensate is an amino aldehyde condensate and is introduced into said web in the form of its corresponding alkyl ether wherein said alkyl moieties are derived from $C_1$ to $C_4$ alcohols.

78. A product as claimed in claim 69 wherein said amino component of said amino-aldehyde condensate is an azine or carbamide moiety.

79. A product as claimed in claim 78 wherein said azine moiety is a diazine or a triazine.

80. A product as claimed in claim 79 wherein said azine moiety is a triazine.

81. A product as claimed in claim 80 wherein said azine moiety is a methyl ether of trimethylol melamine.

82. A pressure-sensitive adhesive tape as claimed in claim 80 wherein said azine moiety is a tris methoxy methyl melamine, hexamethoxy methyl melamine or tris hydroxymethyl tris methoxy methyl melamine or a mixture thereof.

83. A product as claimed in claim 24 wherein said aldehyde-based condensate is a thermosetting s-triazine formaldehyde condensation product.

84. A product as claimed in claim 83 wherein said aldehyde-based condensate is a thermosetting melamine formaldehyde condensation product.

85. A product laminate having a thickness of up to about 21 mils and including a frangible substrate consisting essentially of a cured thermoset resin prepared from an aldehyde condensate and a water-insoluble elastomeric pressure-sensitive adhesive secured to at least one side of said substrate.

86. A product as claimed in claim 1, 24 or 85, wherin said product has a thickness of 1.3 mil to 21 mils.

87. A product as claimed in claim 24 or claim 85 wherein said substrate is present as a single ply and said pressure-sensitive adhesive is secured to both sides of said substrate.

88. A product as claimed in claim 85; wherein said substrate includes a flame retardant compound.

89. A product as claimed in claim 85 wherein said laminate has a thickness sufficient for use thereof as a flying splice.

* * * * *